(12) United States Patent
Oehler et al.

(10) Patent No.: US 10,989,018 B2
(45) Date of Patent: Apr. 27, 2021

(54) PROPPANT DISPENSING SYSTEM WITH METERING CONVEYOR

(71) Applicant: Proppant Express Solutions, LLC, Denver, CO (US)

(72) Inventors: Matthew Oehler, Denver, CO (US); Mark Kevin Fisher, Castle Rock, CO (US); Ian Wilson, Denver, CO (US); Scott Joseph D'Agostino, Bozeman, MT (US); Mark John D'Agostino, Bozeman, MT (US); Brian Dorfman, Denver, CO (US); Cory Snyder, Denver, CO (US); William Scott Malone, Denver, CO (US)

(73) Assignee: Proppant Express Solutions, LLC, Denver, CO (US)

( * ) Notice: Subject to any disclaimer, the term of this patent is extended or adjusted under 35 U.S.C. 154(b) by 0 days.

(21) Appl. No.: 16/852,137

(22) Filed: Apr. 17, 2020

(65) Prior Publication Data

US 2020/0240237 A1    Jul. 30, 2020

Related U.S. Application Data

(62) Division of application No. 16/536,871, filed on Aug. 9, 2019, and a division of application No. PCT/US2019/045952, filed on Aug. 9, 2019.

(60) Provisional application No. 62/876,973, filed on Jul. 22, 2019, provisional application No. 62/720,430, (Continued)

(51) Int. Cl.
*E21B 34/06* (2006.01)
*B65G 27/16* (2006.01)
*E21B 33/10* (2006.01)
*E21B 43/267* (2006.01)

(52) U.S. Cl.
CPC .............. *E21B 34/06* (2013.01); *B65G 27/16* (2013.01); *B65G 2201/045* (2013.01); *E21B 33/10* (2013.01); *E21B 43/267* (2013.01)

(58) Field of Classification Search
CPC ........ E21B 34/06; E21B 33/10; E21B 43/267; E21B 43/26; E21B 43/29; B65G 27/16; B65G 2201/045
See application file for complete search history.

(56) References Cited

U.S. PATENT DOCUMENTS

| | | |
|---|---|---|
| 2,501,743 A | 3/1950 | Schellentrager |
| 2,759,591 A | 8/1956 | Erickson |

(Continued)

FOREIGN PATENT DOCUMENTS

| | | |
|---|---|---|
| CN | 2017829222 A | 6/2017 |
| CN | 1071488843 A | 9/2017 |

(Continued)

*Primary Examiner* — Aaron L Lembo
(74) *Attorney, Agent, or Firm* — Fennemore Craig, P.C.

(57) ABSTRACT

A proppant container facilitates the transportation of wet sand for use in a hydraulic fracturing operation. A metering conveyor is positioned between a blender tub and a proppant motive mechanism, such as a conveyor or wash system that receives discharge direct from proppant containers of the type normally used to transport sand in support of a hydraulic fracturing operation. The metering conveyor is fitted with sensors and/or a knife-edge gate that may be used to facilitate flow control operations.

20 Claims, 30 Drawing Sheets

Related U.S. Application Data filed on Aug. 21, 2018, provisional application No. 62/717,507, filed on Aug. 10, 2018.

(56) References Cited

U.S. PATENT DOCUMENTS

| | | | | |
|---|---|---|---|---|
| 3,083,057 | A * | 3/1963 | Kiser | A01D 90/10 |
| | | | | 298/7 |
| 3,552,346 | A * | 1/1971 | Garden | B65B 1/08 |
| | | | | 141/72 |
| 3,563,364 | A | 2/1971 | Arndt | |
| 3,602,402 | A * | 8/1971 | Garden | B65B 1/08 |
| | | | | 222/196 |
| 3,675,752 | A * | 7/1972 | Quigley | B65G 65/00 |
| | | | | 193/5 |
| 4,044,921 | A * | 8/1977 | Caverly | B65D 88/68 |
| | | | | 222/74 |
| 4,108,188 | A * | 8/1978 | McMullen | B22C 5/08 |
| | | | | 134/57 R |
| 4,469,247 | A | 9/1984 | Tompkins | |
| 4,581,988 | A | 4/1986 | Mattei | |
| 5,829,949 | A * | 11/1998 | Brown | E02F 3/40 |
| | | | | 414/725 |
| 6,321,860 | B1 | 11/2001 | Reddoch | |
| 6,367,959 | B1 | 4/2002 | Kraus | |
| 7,954,520 | B2 * | 6/2011 | England | B65B 67/12 |
| | | | | 141/114 |
| 9,670,752 | B2 * | 6/2017 | Glynn | E21B 41/00 |
| 10,023,790 | B1 | 7/2018 | Unimin | |
| 10,023,791 | B1 | 7/2018 | Corcoran | |
| 10,076,733 | B2 | 9/2018 | Morris | |
| 10,150,612 | B2 | 12/2018 | Schlumberger | |
| 10,378,326 | B2 * | 8/2019 | Morris | F04B 17/06 |
| 10,618,744 | B2 * | 4/2020 | Eiden, III | B65D 88/54 |
| 2006/0048332 | A1 | 3/2006 | Engel | |
| 2006/0289166 | A1 * | 12/2006 | Stromquist | E21B 43/267 |
| | | | | 166/305.1 |
| 2009/0308602 | A1 | 12/2009 | Bruins | |
| 2013/0105166 | A1 | 5/2013 | Medvedev | |
| 2014/0251623 | A1 | 9/2014 | Prostim | |
| 2015/0086307 | A1 | 3/2015 | Stefan | |
| 2016/0032703 | A1 | 2/2016 | Broussard et al. | |
| 2016/0280480 | A1 | 9/2016 | Smith et al. | |
| 2017/0144831 | A1 * | 5/2017 | Hodgson | B65G 11/026 |
| 2017/0259227 | A1 | 9/2017 | Morris et al. | |
| 2018/0339278 | A1 | 11/2018 | Morris et al. | |
| 2019/0009232 | A1 | 1/2019 | Yeung | |
| 2019/0248578 | A1 | 8/2019 | Managan, II et al. | |
| 2020/0048985 | A1 * | 2/2020 | Oehler | B65G 65/42 |
| 2020/0197883 | A1 * | 6/2020 | Oklejas, Jr. | B01F 15/00344 |

FOREIGN PATENT DOCUMENTS

| | | |
|---|---|---|
| CN | 206912171 U | 1/2018 |
| CN | 207431170 U | 6/2018 |
| CN | 207667561 U | 7/2018 |
| CN | 207715108 U | 8/2018 |
| GB | 674121 A | 6/1952 |
| JP | 4812084 B2 | 11/2011 |
| KR | 100588531 B1 | 6/2006 |
| KR | 100650509 B1 | 11/2006 |
| KR | 101330534 B1 | 8/2016 |
| KR | 101648299 B1 | 8/2016 |
| KR | 20170067526 A | 6/2017 |
| KR | 101782330 B1 | 9/2017 |
| KR | 101815786 B1 | 1/2018 |
| WO | 2018022079 A1 | 2/2018 |

* cited by examiner

PROPPANT DISPENSING SYSTEM WITH METERING CONVEYOR

RELATED APPLICATIONS

This application is a divisional with respect to U.S. application Ser. No. 16/536,871 filed Aug. 9, 2019 and International Application PCT/US2019/045952 also filed on Aug. 9, 2019, both of which applications claims benefit of priority to U.S. provisional patent applications 62/717,507 filed Aug. 10, 2018, 62/720,430 filed on Aug. 21, 2018, and 62/876,973 filed Jul. 22, 2019, all of which are incorporated by reference to the same extent as though fully replicated herein.

BACKGROUND

Field of the Invention

The presently disclosed instrumentalities pertain to the field of containerized equipment for the transport of sand and, particularly, for the delivery of sand or other proppant for use in hydraulic fracturing operations.

Description of the Related Art

Hydraulic fracturing is a well-known well stimulation technique in which pressurized liquid is utilized to fracture rock. In the usual case, this liquid is primarily water that contains sand or other proppants that hold open fractures which form during this process. The resulting "frac fluid" may sometimes benefit from the use of thickening agents, but these fluids are increasingly water-based. Originating in the year 1947, the use of fracturing technology has grown such that approximately 2.5 million hydraulic fracturing operations have been performed worldwide by 2012. The use of hydraulic fracturing is increasing. Massive hydraulic fracturing operations on shales now routinely consume more than a million pounds of sand. Hydraulic fracturing makes it possible to drill commercially viable oil and gas wells in formations that were previously understood to be commercially unviable. Other applications for hydraulic fracturing include injection wells, geothermal wells, and water wells.

The widespread use of hydraulic fracturing creates significant demand for sand and other proppants. Considering the Permian Basin alone, demand has recently increased by almost 70% year over year. The Permian is thought to have consumed approximately 10.8 billion pounds of proppant in 2017. The most common proppant in use is sand. Sand suppliers typically mine or quarry the sand, sort it by size and dry the sand. The sand is then placed into containers and loaded onto trucks or rail cars for transport to a well site where there is a need for the sand. By way of example, U.S. Pat. No. 9,758,082 to Eiden III et al., which is hereby incorporated by reference to the same extent as though fully replicated herein, shows one system for containerizing the sand for use at a wellsite, as well as a conveyor sled for transporting the sand from the containers to a blending unit where frac fluid is mixed.

The cost of capital equipment for drying the sand is a limiting factor when developing new sand mining facilities. The price of sand reflects the cost of recouping this capital investment, together with transportation charges from mines that are increasingly remote from where the sand is used.

Frac sand is primarily silicon dioxide in an unconsolidated form and is frequently mined when wet. The sand has a porosity that typically exceeds about 30% where all or part of this volume may be filled with water. FIG. 1 is a midsectional view of a proppant container or pod 100 like that described in Eiden III and illustrates a problem that happens if these prior art containers are filled with wet sand 102. The wet sand agglomerates into a mass that will not discharge properly from the container 100. Either there is no discharge at all, or else sometimes a hole 104 may open down through the sand 102 above the discharge gate 106. Water in the sand makes it difficult or impossible to unload the container. For these reasons, conventional wisdom holds that the sand used as proppant in hydraulic fracturing operations needs to be dry. Accordingly, the sand is sieved and dried before it is mixed with fluids in a blender tub. This may constitute a considerable expense where hydraulic fracturing jobs may use several million pounds of sand.

In other challenges, changing governmental regulations and basic concerns over worker safety present additional concerns for the industry. New regulations are scheduled to become effective which severely restrict the exposure workers may receive of dust, especially silica dust from sand. In the United States, for example, the Occupational Safety and Health Administration is requiring employers to limit exposure to respirable crystalline silica to 50 $\mu g/m^3$ as an eight-hour time-weighted average. Employers in the hydraulic fracturing industry must comply with these regulations by Jun. 23, 2021.

SUMMARY

The instrumentalities disclosed herein overcome the problems outlined above and advance the art by improving systems for transporting and dispensing sand during the performance of a hydraulic fracturing operation. The system may advantageously utilize sand in wet or dry form where the sand is unprocessed in the sense that the sand has not been sieved to final grade and dried. As used herein, however, the term 'unprocessed sand" may include sand that has been screened through a mesh having large openings such as ¼ inch, ½ inch, 1 inch, 1½ inch, or 2-inch openings to remove debris such as roots, twigs, and larger rocks. Where the unprocessed sand may be dry sand, additional measures may be utilized for the control of dust. These advances are also beneficial when using processed sand.

In one aspect, where from 4% to 17% of the sand pore volume can retain water when sand is wet, the inclusion of water in non-dried sand increases the shipping cost by a negligible amount. Thus, there is no need to dry the sand to save weight and corresponding transportation charges. Past practices have, however, found it necessary to dry the sand for use in hydraulic fracturing due to the cohesiveness of wet sand contributing to problems like that shown in FIG. 1. As used herein, "wet sand" means sand having at least 1% by weight of water, and may include sand having at least 2%, 4%, 6%, 8%, 10%, 12%, 14%, 16% or more by weight of water. Slurried systems having more than about 10% or 20% water by weight may facilitate the flow of sand.

It has been discovered that a vibrator assembly may be used on these containers in a manner that permits utilization of wet sand. This advantageously permits regional sand quarries to mitigate the need for expensive sand drying equipment and sand drying operations. The vibrator assembly disrupts the cohesion of wet sand that, otherwise, results in the problem discussed above in context of FIG. 1.

According to one embodiment, a proppant container is constructed and arranged for use in transporting sand and dispensing sand. The proppant container may be improved by the addition of a vibrator assembly adapting the container for dispensation of wet sand.

In one aspect, the proppant container may include sidewalls forming a box that descends into a hopper. The vibrator contacts the walls or the hopper to facilitate discharge of sand through a gate that governs the discharge of sand through the hopper. In the alternative, the vibrator may be part of the box, attached to or removed from the box, mounted on the conveyor or mounted on a separate stand between the box and conveyor. The cohesion between proppant grains may also be broken to impart proppant flow by aeration. The aeration will break the cohesion with air flow into the proppant pack directly or by causing a similar vibration previously described using a vibrator.

In one aspect, wet sand removed from the proppant container by the vibration system may feed onto a belt or drag link system. That system may feed the blender's sand hopper which may require a vibration system or feed directly to blender tub. If it feeds direct to blender tub, a software control system tied to blender fluid parameters, such as flow rate and density, may deliver proppant direct to the blender tub based on design requirements for proppant concentration in the frac treatment.

In one aspect, a wash system is optionally provided to spray water or another liquid inside the proppant container to facilitate the dispensation of sand from the container. The wash system may be utilized alone or in combination with the vibrator. The wash system sprays into a container inlet and washes sand towards a container outlet.

A plurality of these containers may be utilized on a rack that is equipped with a wash system arranged to facilitate dispensation of sand from at least one of the proppant containers. In one aspect, an automated flow controller is constructed to obtain density and flowrate information, and to form a slurry within design specifications to feed a blender tub for a hydraulic fracturing operation over a period. This type of system has no need of a conveyor belt in transporting sand for the containers to a blender tub.

In one aspect, the wash system may include a water source and a trough that receives both sand and water for slurry formation. The wash system may also include a loop for recirculating the slurry through the trough. A level indicator in the trough permits the automated flow controller to maintain slurry within the trough at a level within a range sensed by the level indicator.

According to one embodiment, the automated flow controller is programmed in a loop that first determines a flowrate adjustment as needed for conformity with design specifications, then determines a density adjustment. The automated flow controller may operate by wireless means to communicate with a plurality of densitometers, flowmeters, and pumps on the rack.

According to one embodiment, a computer readable storage medium has data stored therein representing software executable by a computer. The software includes instructions to automate flow control during a hydraulic fracturing operation. These instructions are operable for: obtaining hydraulic fracturing job design parameters including at least proppant slurry flowrate and proppant slurry density values; receiving sensed proppant slurry flowrate and proppant slurry density values during performance of the hydraulic fracturing job; determining whether the sensed proppant slurry flowrate is according to design specification and, if the sensed proppant slurry flowrate is out of specification, for determining a flowrate adjustment as needed to bring the flowrate within specification; and determining whether the sensed proppant slurry density is according to design specification. If the sensed proppant slurry density is out of specification, the software includes instructions for determining a mass adjustment as needed to bring the density within specification. The software also permits the automated flow controller to implement the flowrate and density adjustments by adjusting the output of various system pumps.

In one aspect, a knife edge gate may be utilized to make a ribbon of proppant having a substantially uniform thickness as the proppant is dispensed from a surge hopper onto a conveyor belt. This uniform thickness facilitates volumetric control of the proppant by adjusting the speed of the conveyor belt, which is useful for purposes of ascertaining proppant flow rates in context of mass flow control. A surge hopper of this nature may have a top opening that tapers downwardly to a discharge opening, and at least one sidewall with a side opening therethrough. A pair of opposed vertical channels are mounted on the hopper proximate the side opening. A plate is slidingly engaged within the pair of opposed channels to cover the side opening at a selected height. A clamp assembly retains the plate at a fixed position relative to the side opening. The clamp assembly may be used for selective adjustment of the height of the plate above a conveyor belt where the thickness of the ribbon of sand coincides with the height of the plate above the conveyor belt.

According to various embodiments, the system may utilize various strategies for dust mitigation when dry sand is in use. This may include, for example, a mist spray system, a baghouse, a closed operator's quarters, and an agglomerating yoke.

In one embodiment, a misting system is provided for the mitigation of dust. The misting system contains conveyor system having an endless belt and a discharge area. A water supply feeds a spray head assembly that is mounted proximate the discharge area of the conveyor system. The water supply system includes at least a hose or pipe connecting the water supply to the spray head assembly and may include also a heater to warm water in cold climates, a chemical injector for treating the water, a filter, and a pump to pressurize the water. The spray head assembly is configured to emit a fine mist encompassing the discharge area such that water droplets coalesce on dust particles emanating from the conveyor system at the discharge area when the conveyor system is in use to dispense proppant in support of a hydraulic fracturing operation, whereby the water droplets remove dust from the air.

In various preferred aspects, the misting system may include a valve for adjusting pressure in the tubular member downstream of the pump for control of flow rate through the spray head assembly. The pump may be powered electronically, or with a power take off from the conveyor system. The spray head assembly may be formed using, for example, a tubular body in a geometric shape commensurate with a pattern covering the discharge area. A plurality of spray heads mounted on the tubular body may be arranged to emit water over the pattern. The geometric pattern may be, for example, that of a bar, an arc or a circle.

The spray heads of the misting system preferably include at least one atomizing spray head that accepts an air supply to facilitate atomization or fogging of the water. Spray heads of this type may be purchased on commercial order to emit water in predetermined amounts, such as from 0.03 to 0.25 gallons per minute (gpm), 0.05 to 0.5 gpm, 0.5 to 1.5 gpm, 0.7 to 7 gpm, 1.3 to 13 gpm, or 10 to 30 gpm. These ranges encompass the range of what rates of water may be emitted from a single spray head, as well as a plurality of spray heads on the spray head assembly.

According to one embodiment, a dust mitigation system used in hydraulic fracturing operations may contain a baghouse. A conveyor assembly having an endless belt is configured to discharge proppant into a discharge area. A cover encompasses the discharge area for containment of dust emanating from the proppant when the conveyor system is in use. The cover isolates the discharge area as an interior space within the cover and has an opening for passage of the conveyor assembly into the interior space. A blower is deployed on the cover to pull outside air along a pathway through the opening, into the interior space, through a filter, and then outside of the interior space. This arrangement forms, for example, a selectively positionable baghouse that may be used at the point of any proppant transfer, such as the discharge of one conveyor system info a bin or hopper, or at any point where a first conveyor system transfers proppant to a second conveyor system.

In one aspect, the cover has a top, with the blower and filter residing on the top of the cover. This permits trapped proppant dust to fall downward where the dust may be recycled into the flow of proppant that is used for fracturing the well. To facilitate cleaning of the filter, the blower may be configured for selective activation to move air backwards on the pathway as needed for cleaning of the filter.

The cover may be made of a fabric, steel or a composite. In the case of fabric, the cover and blower are supported by a frame, which may be an internal or external frame. The fabric cover may be attached to the frame using rope that passes through eyelets on the cover and wraps around the frame.

The filter may be any type of filter or combination of filters, such as a size exclusion filter cyclonic filter, or a high throughput filter that is enhanced by the use of corona charging such as is reported in U.S. Pat. No. 5,549,735 to Coppom, which is incorporated by reference to the same extent as though fully replicated herein.

According to one embodiment, the dust mitigation system or apparatus, may include an agglomerating yoke. A yoke body has an upper inlet and a lower outlet such that proppant may flow through the yoke body under the influence of gravity. A flow passage through the yoke body connects the upper inlet with the lower outlet. A door assembly is provided that is normally biased into a closed position covering the lower outlet. The door assembly has at least a first door and may have a plurality of doors operating in opposition to restrict flow of proppant from the yoke body. A pivot is provided to permit axial pivoting of the first door between the closed position covering the lower outlet and an open position that is pivoted outwardly away from the lower outlet. A first counterweight assembly resides on the door at a position such that gravity acting upon a counterweight biases the door into the closed position. The first counterweight assembly has a mechanism permitting selective movement of the counterweight to increase or decrease the amount of bias exerted by the first counterweight assembly on the first door under the influence of gravitational forces. The bias exerted in this manner is sufficient to delay the passage of proppant through the flow passage as proppant is flowing form the upper inlet towards the lower outlet, creating a residence time within the flow passage sufficient for the agglomeration of dust. This residence time may be, for example, suitably from 1 to 3 seconds or more.

The door assembly preferably includes a second door and a second counterweight assembly operating in tandem with the first door and the first counterweight assembly for the mitigation of dust.

In one aspect, the first counterweight assembly or assemblies may include a hydraulic actuator constructed and arranged to move the counterweight in a manner that varies the leverage exerted by gravity on the corresponding door. This mechanism may additionally include a motive means, such as a hydraulic actuator or gearing system. By way of example, a radio-actuated electric motor may be configured to drive the hydraulic actuator or gearing system based upon control signals originating from an operator's panel.

The yoke body is preferably located to receive proppant as the proppant discharges from the discharge element of a proppant motive mechanism, such as a conveyor belt or drag link system. The upper inlet of the yoke body is then positioned to receive proppant from the discharge element when the proppant motive mechanism is moving proppant. The yoke body is also positioned to discharge into a bin, another hopper, or the inlet of a second conveyor located beneath the lower outlet of the yoke body.

Preferred but optional embodiments include protection from overfill of the yoke body. Where the yoke body is set up to discharge into a second device, such as a bin or hopper, it is preferred that the upper inlet of the yok body is smaller than the inlet into which the yoke body is discharging. In this manner, spillage from the yoke body overflows into the second structure. Spillage of this nature indicates a need to adjust the counterweight assemblies to exert less force on the doors upon which the counterweight assemblies reside.

In preferred embodiments, the yoke body tapers downwardly from the upper inlet to the lower outlet, and the flow passage of the hoke body may be provided with baffles, plates, or rods to retard the flow pf proppant through the flow passage. The dust mitigation apparatus may be used in combination with other dust mitigate devices, such as the baghouse or the mist spray system described above.

Another such improvement is an isolated control room that provides a safe environment protecting equipment operators from excessive dust exposure. Any roadable piece of surface equipment for use in a hydraulic fracturing operation may be provided with a control cabin that is mounted on the surface equipment. The control cabin may include a covering, such as a fabric, steel or composite material, that defines and isolates an interior space. A door, such as a flap in the cover or a frame with a hinge mounted door, electively isolates the interior space and may be selectively opened to provide egress to and from the interior space. An operator's control panel resides in the interior space and is constructed and arranged to permit an operator to control one or more aspects of a hydraulic fracturing operation. A blower may be provided, for example, to push air into the covering to provide a positive pressure environment therein relative to ambient pressure outside the covering when the door is isolating the interior space. A filter operates in conjunction with the blower for removal of dust from the that is air pushed by the blower.

In one aspect, the blower may form part of a heating or cooling system, such that the air pushed by the blower travels across a heat exchanger for heating or cooling. system. The surface equipment may be, for example, a conventional blending unit, a conveyor sled assembly, a pumping unit, or a frac van that is improved by retrofitting to install, the isolated control room described above.

It will be appreciated that any of the foregoing instrumentalities may be utilized to provide their respective purposes of fracking a well with wet sand, flow control, or dust mitigation when performing a hydraulic fracturing operation to stimulate a well. These instrumentalities may be used alone or in combination.

DETAILED DESCRIPTION

There will now be shown and described, by way of non-limiting examples, various instrumentalities for overcoming the problems discussed above.

Wet Sand Dispensing Equipment.

The ability to dispense wet sand has advantages in cost reduction, as discussed above, as well as dust mitigation. However, the surface equipment presently in use for dispensing sand during a hydraulic fracturing operation is incapable of dispensing wet sand. The instrumentalities disclosed below advance the art by permitting the use of wet and/or unprocessed sand while providing also for dust mitigation sufficient to meet newly emerging regulatory requirements.

Vibratory Action

Figure 1:
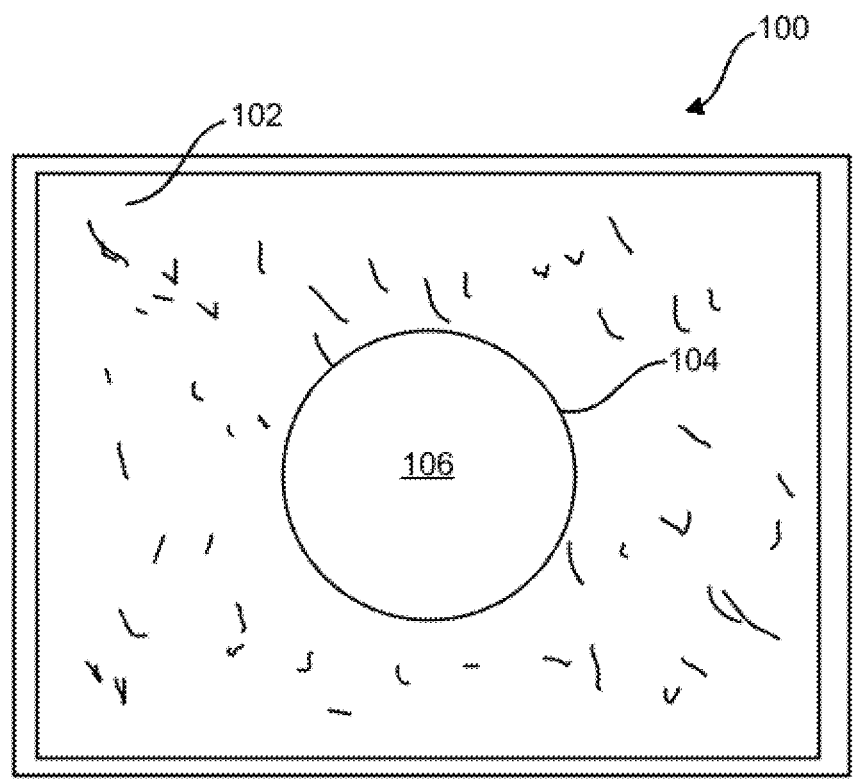
FIG. 1 is a midsection view of proppant container of the prior art, showing a problem that arises with the use of wet sand.
Figure 2:
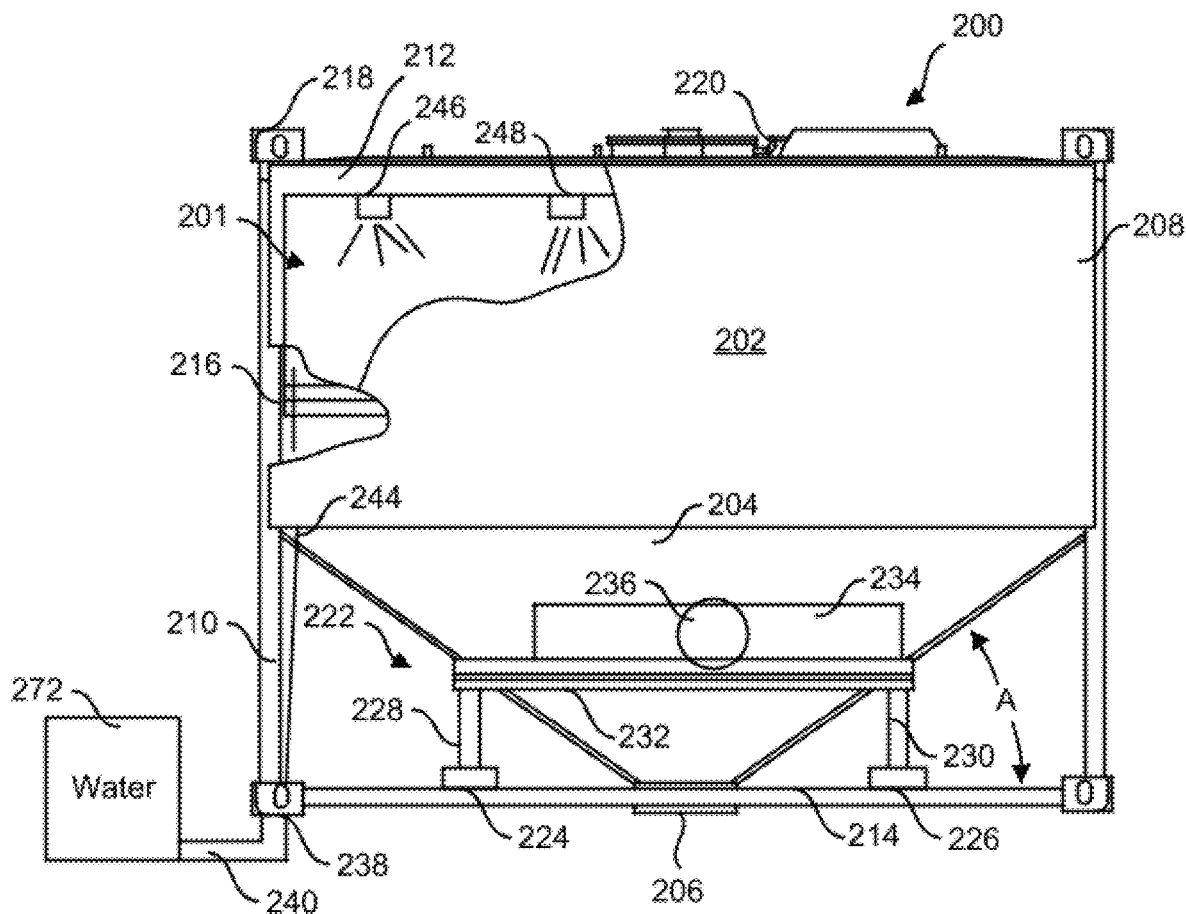
FIG. 2 shows a proppant container that has been fitted with a vibrator enabling the use of wet sand.

FIG. 2 shows a proppant container 200 that has been equipped to facilitate the use of wet proppant during a hydraulic fracturing operation. The container 200 has an interior 201 that is defined by an opposed system of four vertical rectilinear sidewalls, such as sidewall 202, and a hopper 204 leading to a sand outlet at discharge gate 206. The sidewalls 202 are supported by a frame that includes a plurality of upright members 208, 210, horizontal members 212, 214 and internal crease members 216. Corners of the frame may be provided with intermodal connectors 218. A top hatch assembly 220 forms an inlet that is used to fill the interior 201 of container 200 with proppant, such as sand or ceramic proppants. The gate 206 is optionally a ladder gate, a clamshell gate, or an iris gate that may be mechanically opened and closed for the selective discharge of proppant.

A lower frame assembly 222 circumscribes the hopper 204. The walls of the hopper 204 reside at an angle "A" that facilitates the discharge of dry proppant. The angle A preferably rises by at least 35° relative to horizontal. Forklift tubes 224, 226 are made to receive the tongs of a forklift for moving the container 200. The forklift tubes 224, 226 are welded to horizontal support members 214. Risers 228, 230 connect the forklift tubes 224, 226 to an upper horizontal frame member 232 that is welded to the hopper 204.

A vibrator 234 driven by electric motor 236 provides sufficient vibration to cause wet sand within container 208 to discharge through gate 206. The vibrator 234 applies the vibratory force to the hopper 204, which facilitates the discharge of wet sand from the interior 201. The electric motor 236 imparts rotary motion to a set of eccentric weights that impart an omnidirectional vibratory force. One example of commercially available electronic industrial vibrators suitable for this purpose includes the Model 4P Series of vibrators from Metalfab, Inc. of Vernon, N.J. These vibrators have a range of sizes with adjustable weights for control of the amplitude of vibration. Depending upon the model selected and the weight adjustment settings, these vibrators may deliver from 300 to 15,000 pounds of vibratory force with 1800 vibrations per minute. The frequency of vibration may be controlled as a function of rotational velocity of the motor of the vibrator 234. In one such example, there is a Model 4P-1.4KT$^M$ that weighs 63 pounds and produces one horsepower of vibration that delivers 1400 pounds of vibrational force and draws 3 amps at 230 volts or 1.5 amps at 460 volts. Although FIG. 2 shows the vibrator 234 contacting the hopper 204, the vibrator 234 may be mounted on any part of the container 200, attached/removed from the container 200, mounted on a conveyor sled (shown below) or mounted on a separate stand between the container 200 and the conveyor. The vibrator 234 is connected to a source of electricity from the conveyor (not shown). For the conveyor-mounted containers according to one embodiment, it is possible to place the vibrator 234 on footing or rails where the container resides on a conveyor sled assembly in a configuration such that the vibrator 234 shakes the container that resides atop the vibrator 234. More than one vibrator 234 may be installed on a container, conveyor or separate stand between box and conveyor.

Figure 3:
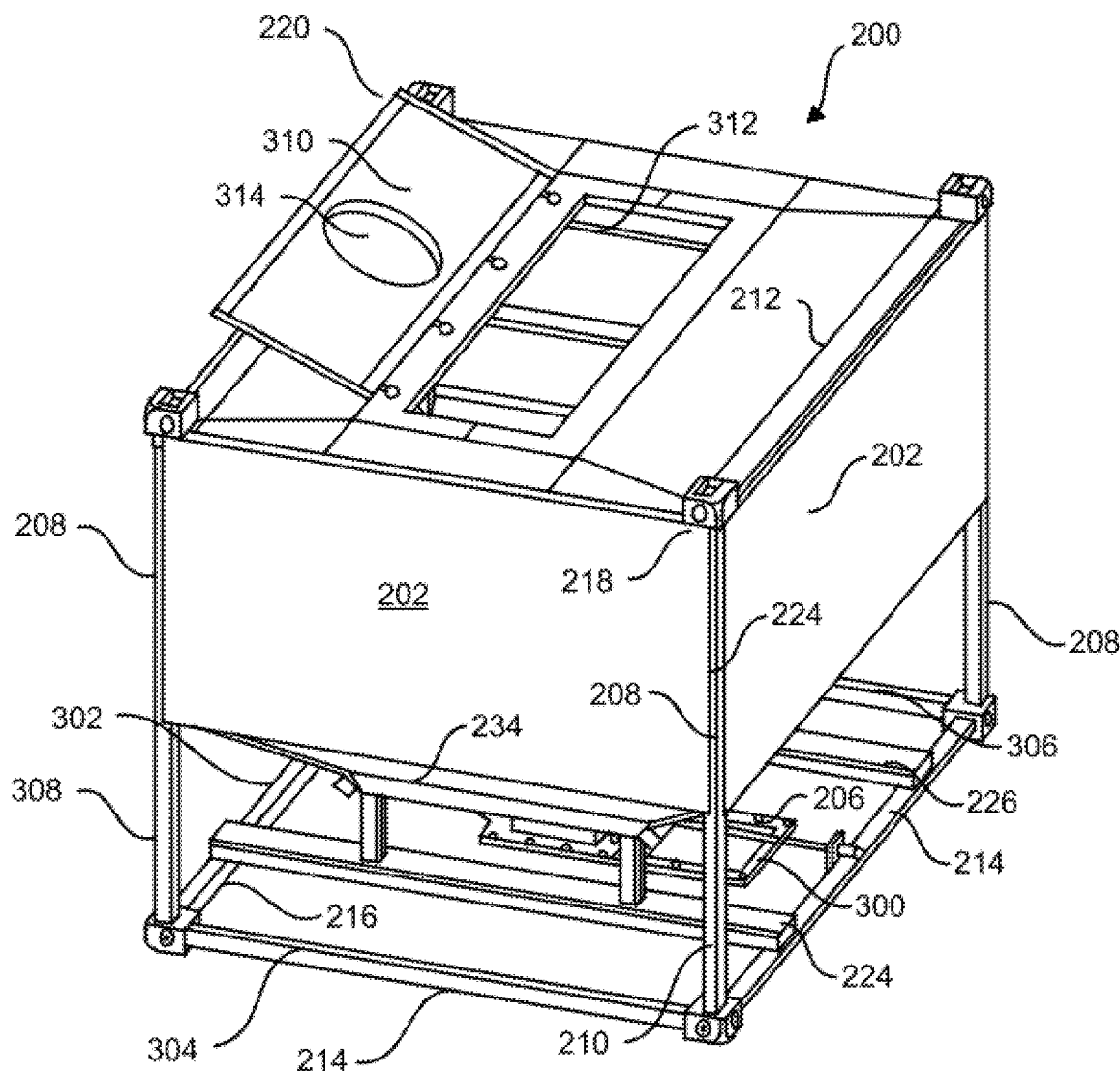
FIG. 3 provides additional detail regarding the proppant container with the vibrator.
Figure 4:
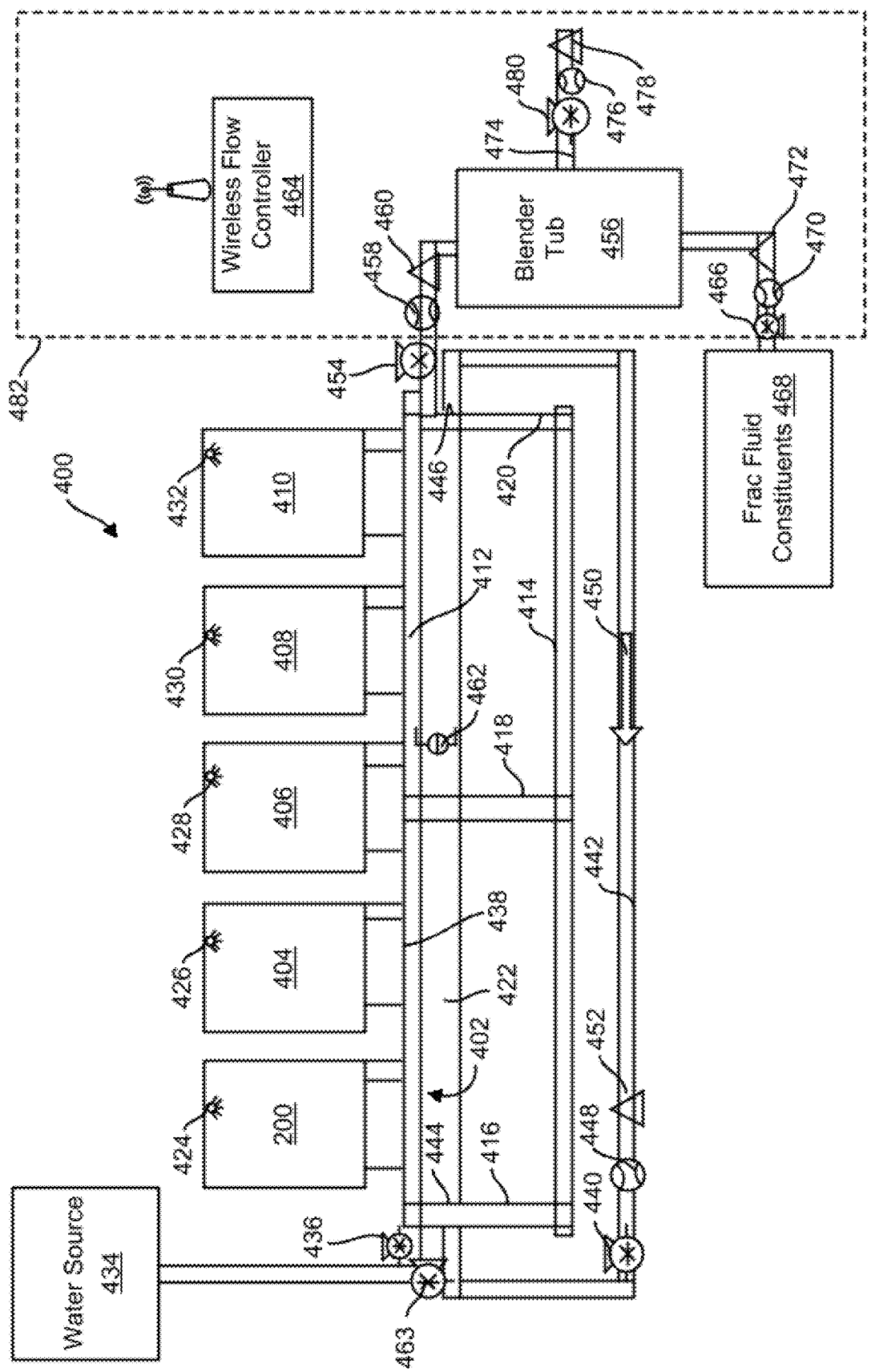
FIG. 4 shows a wet sand feeder system that is equipped to utilize a plurality of containers that are filled with wet sand and has a liquid wash system for enhanced flow control of sand going into a blender tub that is used in a hydraulic fracturing operation.

Optionally, the proppant container 200 is fitted with a female connector 238 that receives a tubular male member 240 for supply of water 242 to a pipe 244. The pipe 244 delivers water to internal spray nozzles 246, 248. In addition to vibration, the use of water provides a secondary means to move sand. For example, wet sand at 15-20% by weight of water may flow much easier than sand at 5-7%. Adding water to increase the percentage of water improves flow while reducing amount of vibration that is needed to fluidize the wet sand. The amount of water delivered in this manner may be metered and accounted for as contributing to the design specifications of the final frac fluid that is pumped down a well FIG. 3 shows the container 200 from a left front top perspective. A screw drive 300 is used to open and close the gate 206. Additional frame members not shown in FIG. 2 include, for example, horizontal frame members 302, 304, 306 and vertical member 308. As shown in FIG. 4, the top hatch assembly 220 includes a rectangular door 310 that is configured to seal a corresponding rectangular opening 312. The rectangular door 310 is provided with a circular hatch 314 that is easy to open when the container 200 is being filled with sand. In alternative embodiments, the hatch assembly 220 may cover openings that have other shapes, such as a round or square opening (not shown) where there may optionally also be a single hatch.

Slurry Transport System with Flow Controller

FIG. 4 shows a sand distribution assembly 400 that includes the container 200 sitting atop a rack 402 together with containers 404, 406, 408, 410. The containers 404-410 are identical to container 200. The rack 402 includes a top rail 412 that provides predetermined seating positions for each of the containers 200, 404-410. The rack 402 also includes a ground-contacting rail 414 and support legs 416, 418, 420, all of which are mirrored on the remote side of the rack (not shown).

A trough 422 is positioned to receive sand that is discharged from the respective containers 200, 404-410. The sand is optionally washed into a trough 422 from the containers 200, 404-410 by spray nozzles 424, 426, 428, 430, 432 which may be allocated to their corresponding containers 200, 404-410. The spray nozzles 422-432 receive water from water source 434. The water is pressurized by the action of a centrifugal pump 436, which discharges into a rack-mounted spray feeder line 438, that feeds the spray nozzles 424-432. A centrifugal pump 440 circulates a slurry mixture of sand and water through trough 422 and line 442 between trough inlet 444 and trough outlet 446. A flowmeter 448 in line 442 measures the rate of flow 450 to assure proper mixing of sand and water, as is confirmed by a densitometer 452.

The system described above is capable of pumping slurried sand in a loop with additions and subtractions from the flow. A centrifugal pump 454 with a programmatically controlled rate of pumping removes slurry from the trough 422 for delivery to a blender tub 456. A flowmeter 458 and densitometer 460 provide additional measurements characterizing the flow rate and sand content of the slurry exiting the centrifugal pump 454. A level indicator 462 provides signals indicating a level of slurry within the trough 422. A centrifugal pump 463 may be actuated on demand to introduce additional water into the trough 422 from water source 434 according to requirements as indicated by the level indicator 462.

A wireless programmable flow controller 464 receives signals from the flowmeters 448, 458 and the densitometers 452, 460 to assess the rate and content of flow within the trough 422 and into the blender tub 456. The flow controller 464 actuates the centrifugal pump 436 to wash additional sand into the trough 422 whenever slurry density needs to increase and to compensate for sand being discharged from the trough 422 through the centrifugal pump 454. The flow controller 464 actuates the centrifugal pump 463 to introduce additional water into the trough 422 whenever slurry density needs to increase and to compensate for water discharge from the trough 422 through the centrifugal pump 454. The level indicator 462 provides a signal indicating the level of slurry within trough 422.

The measurement from densitometer 460 provides a density reading that governs operation of centrifugal pump 466 to control a rate of mixing between slurry from the trough 422 and a source of frac fluid constituents 468 as specified according to design for a particular hydraulic fracturing operation. A flowmeter 470 confirms the output of centrifugal pump 466 while densitometer 472 measures the density of the frac fluid 468. The blender tub 456 is a standard blender in use for hydraulic fracturing operations and discharges a blended frac fluid mixture through line 474 for use in hydraulic fracturing operations as are known to the art. Flowmeter 476 and densitometer 478 confirm the effluent flowrate and density of the mixture exiting blender tub 456 through line 474. It will be appreciated that the frac fluid constituents 468 may be water, in which case the supply may be from water source 434.

A centrifugal pump 480 may be controlled to pump a volume that may increase or decrease over time according to requirements for a particular hydraulic fracturing job. The volumetric pumping rates of pumps 454, 466 may, accordingly, be driven in synchrony with the volumetric pumping rate of pump 480 so that the volume of proppant or proppant slurry in the blender tub 456 is sufficient to meet job requirements. The centrifugal pumps 436, 440, 454, 462, 466, 480 are not limited to any particular type of pump or volumetric throughput. Centrifugal pumps are suitable for this application and, for example, may be selected to accommodate an expected flowrate of approximately 5 to 20 barrels per minute. Positive displacement pumps are alternatively suitable for flowrates on the lower end of this range. The densitometers 452, 460, 472, 478 are suitably lowpressure radioactive densitometers. The flowmeters 448, 458, 470, 476 are suitably turbine flowmeters. The flow controller 464 may communicate wirelessly with centrifugal pumps 436, 440, 454, 462, 466, 480 to provide instructions governing rate of operation. The flowmeters 448, 458, 470, 476 may wirelessly communicate with flow controller 464 to provide flow measurements. The densitometers 452, 460, 472, 478 may wirelessly communicate with flow controller 464 to provide density measurements.

It will be appreciated that the proppant distribution assembly 400 may be divided into separable components. The centrifugal pumps 454, 466, may be located on the rack 402 or on a separate blending unit (indicated generally by numeral 482), as may the blender tub 456. The flowmeters 448, 458, 470 and the densitometers 452, 460, 472 may also be located either on the rack 402 or the separate blending unit 482. The centrifugal pump 480, flowmeter 476 and densitometer 478 are downstream of the blender tub 456 and may be located on the separate blending unit 482 or in components downstream from the blending unit 482.

Flow Control Logic.

Figure 5:
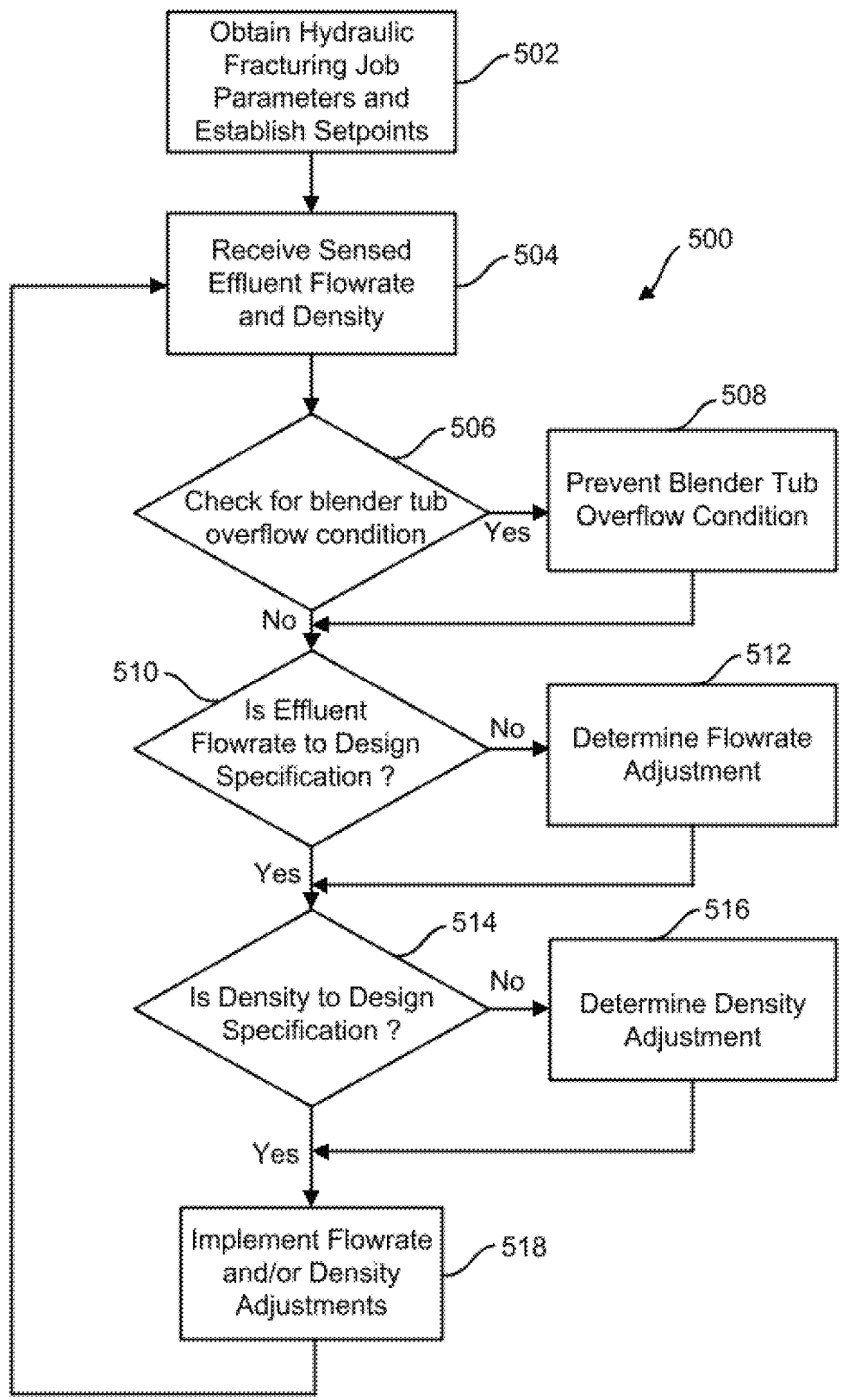
FIG. 5 is a diagram of computer logic for flow control of the system shown in FIG. 4.

In use during a hydraulic fracturing operation, the programmable flow controller 464 includes an internal processor and memory (not shown) that operates using program logic 500 according to the software flowchart of FIG. 5. The purpose of programmatic logic 500 is to obtain density and flowrate information from flowmeter 476 and densitometer 478, i.e., effluent flowrate and effluent density, and to maintain this within design specifications for a particular hydraulic fracturing operation over a period of time. The flow controller 464 has a memory and processor programmed with this logic as software that may be provided on a computer readable medium or form, such as a hard disk, CD-ROM, DVD, or thumb drive. The flow controller 464 utilizes this logic to assure that a ready stream of wet sand or fluidized sand slurry can travel down a sand delivery system (see FIGS. 4 and 6) system and be metered directly into the blender tub with sufficient accuracy to meet the job design parameters and relative changes to those job parameters based on well conditions.

The hydraulic fracturing operation is designed by means known to the art for utilizing such data as water flowrates, fluid compositions and proppant flowrates. The programmable flow controller 464 obtains 502 this data, for example, as operator input or a downloaded data file. The design may be performed, for example, by using commercially available software packages, such as Elfin tgr™ by Rockfield of Houston, Tex., or FracPro™ by Carbo Ceramic, also of Houston, Tex. As the hydraulic fracturing job is underway, the programmable flow controller 464 receives 504 sensed measurements of effluent flowrate and density from flowmeter 458 and densitometer 460. The logic 500 consults the predetermined design criteria for the hydraulic fracturing operation and queries 506 whether the effluent flow rate sensed by flowmeter 458 is exceeding the output of blender tub 456 as sensed by flowmeter 476. If so, then the programmable flow controller 464 acts to prevent 508 the resulting blender tub overflow condition, preferably by signaling an increase in the pumping rate of pump 454. The program next queries 510 whether the effluent flowrate sensed by flowmeter 458 is according to design specifications. If the flowrate is out of spec, the programmable flow controller 464 adjusts the flowrate 512 by controlling the speed of centrifugal pump 454. The program 500 then consults the predetermined design criteria for the hydraulic fracturing operation and queries 514 whether the effluent density is according to design specifications. If the density is out of spec, the flow controller 464 adjusts the density 516 by controlling the speed of one or more of centrifugal pumps 436, 462. Generally speaking, the output of centrifugal pump 436 is increased to correspondingly increase slurry density in trough 422 by washing sand from containers 200, 404, 406, 408, 410. The output of centrifugal pump 463 is increased to add water from water source 434, thereby decreasing density. This is not necessarily an operation where either pump 436 or pump 463 is activated in isolation, for example, since it may be the case that both volume and density need to increase. The process then repeats itself by receiving 504 new sensed effluent flowrate and density measurements. These measurements may be averaged over time to prevent adjustments that are too rapid for practical effects to occur.

One way of determining the flowrate adjustment in step 512 is to calculate a value according to Equation (1):

$$\Delta Q = Q_D - Q_T \qquad (1)$$

where $\Delta Q$ is the flowrate adjustment needed to achieve design specifications, $Q_D$ is the flowrate according to design specifications, and $Q_T$ is the volume exiting the blender tub 456.

Density may be adjusted in step 516 according to Equations (2) and (3):

$$M_A = Q_E(\rho_D - \rho_E) + \rho_D \Delta Q \qquad (2)$$

where $M_A$ is the additional mass per unit time that is required to achieve density $\rho_D$ according to design specification when adjusting flowrate $\Delta Q$, $Q_E$ is the effluent flowrate exiting trough 422, and $\rho_E$ is the density of effluent from trough 422.

The value $M_A$ may be achieved according to Equation (3):

$$M_A = M_S + M_W \qquad (3)$$

where $M_S$ is the mass flowrate of water from water source 434, and $M_W$ is the mass flowrate of slurry emanating from washing the containers 200, 404-410. $M_W$ is determined by use of an empirical correlation that determines the amount of sand and water that exits the containers 200, 404-410 based upon an input of wash water. This is an iterative solution for convergence on $M_A$ that begins with a guess, such as the input of wash water $M_W$ equals the volume of water required to fill trough 422 to a level determined by level indicator 462.

The programmable flow controller 464 then implements 518 these flowrate and density adjustments by adjusting the speed of centrifugal pumps 436, 462, and 454.

Drag Link System with Rate-Controlled Delivery

Figure 6:
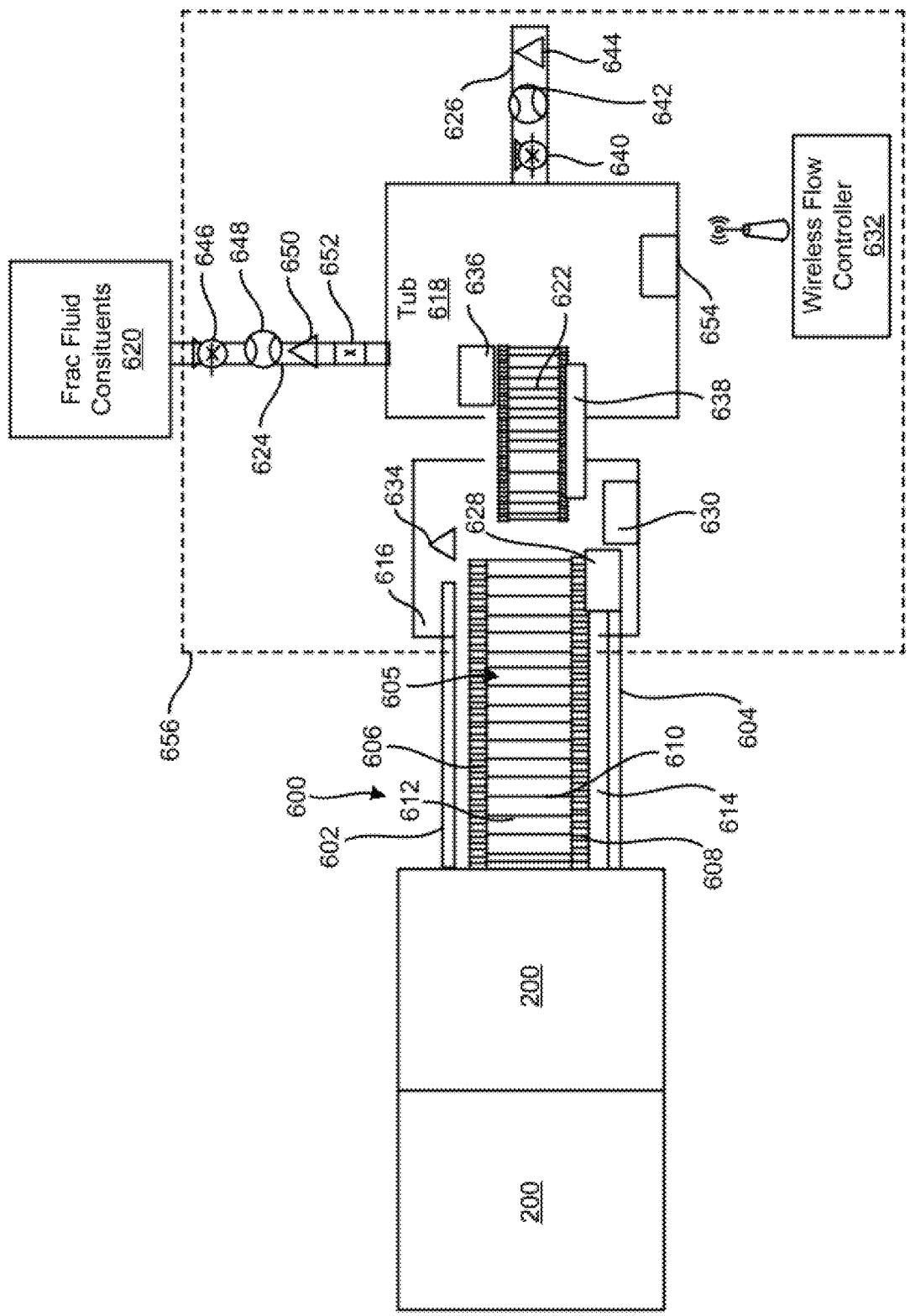
FIG. 6 shows an alternative sand distribution system that utilizes a drag link in place of a conveyor belt.

FIG. 6 shows an alternative wet sand supply system 600. A plurality of containers 200, as described above, sit upon rails 602, 604. A drag link device 605 includes a pair of chains 606, 608 constructed to carry a plurality of cross-bars or links 610, 612 in moving sand that is discharged from the containers 200 through trough 614 towards a surge hopper 616 that feeds a blender tub 618. As shown in FIG. 6, the drag link device 605 runs horizontally.

The surge hopper 616 and the blender tub 618 may exist at different elevations such that the sand from the surge hopper 616 needs to ascend for delivery into the blender tub 618. In this type of system, in order to avoid providing the drag link device 605 with a latter segment (not shown) proximate the blender tub 618 that rises upwardly, it is possible to provide a separate elevator or metering conveyor assembly 622 to impart the elevation increase between the surge hopper 616 and the blender tub 618. The blender tub 618 mixes wet sand from the trough 614 with frac fluid constituents 620 from line 624 and discharges the mixture through line 626 for use in hydraulic fracturing operations.

It will be appreciated that the sand supply system 600 may be provided with densitometers, pumps, and flow meters (not shown) at appropriate control points to provide for automated flow control in support of a hydraulic fracturing operation generally as described in context of FIG. 4. However, in system 600 it is not necessary to carry the sand in a slurry. The sand may contain a lower water content such that the sand or proppant does not necessarily behave as a vibration-induced semiliquid. The sand may also be processed sand or dry sand with minimal use of water.

The drag link device 605 is equipped with a belt motive mechanism 628, such as an electrical motor or hydraulic system configured to advance the proppant-laden fluids by movement of the crossbar links 610, 612. A level indicator 630 may assess the level of proppant in the surge hopper 616, and this level may be calibrated to represent a volume of proppant within the surge hopper 616. A wireless flow controller 632 receives signals from the level indicator 630 and adjusts the speed of the belt motive mechanism 628 to maintain the level of proppant in the surge hopper 616 within an established range of values acting as a buffer for meeting proppant rate delivery requirements for a hydraulic fracturing operation. The rate requirements may be established as operator setpoints that reflect rate requirements as determined by hydraulic fracture modeling as is known in the art, as described above. Thus, the wireless flow controller 632 utilizes the operator's setpoint or another rate requirement to assure that the drag link device 605 and the metering conveyor assembly 622 are driven in synchrony to meet current proppant rate delivery requirements for the conduct of a hydraulic fracturing operation that is in-progress. The control of synchrony in this regard is not necessarily perfect at all times, so the surge hopper 616 acts as a buffer for overages and underages when the drag link mechanism 605 and the metering conveyor 622 are transiently out of sync. Thus, the internal volume of the surge hopper 616 may vary by design as is needed to satisfy volumetric buffering requirements for the expected overages and underages.

Various sensor signals facilitate the programmed synchronicity function of the wireless flow controller 622 according to one embodiment. A densitometer 634 obtains density readings from the proppant material within the surge hopper 616. A motive mechanism 636, such as an electric or hydraulic motor, turns a belt of the metering conveyor assembly 622 at a speed determined by the wireless flow controller 632. The metering conveyor assembly 622 is equipped with a load sensor 638 that provides signals indicating the weight of the proppant on the conveyor. These signals may emanate, for example, from load scales on the motive mechanism 636 that sense the weight of the metering conveyor assembly 622 or from a servo-driven torque gauge as described in United States Patent Publication 2012 0285751 to Turner or U.S. Pat. No. 9,018,544 to Turner, each of which are hereby incorporated by reference to the same extent as though fully replicated herein. Load scales for these belts are alternatively known as conveyor scales or belt scales and may be purchased on commercial order for this use, providing accuracy in the ±2% range. The high level of accuracy and dynamic responsiveness of these systems are well-suited for this use because they enhance the ability of the system to maintain operator setpoints. In some embodiments, the belt motive mechanism 628 and the motive mechanism 636 may be mounted in the surge hopper 616. The belt motive mechanism 628 and the motive mechanism may be driven in synchrony to match operator setpoints for proppant demand according to design needs for a particular hydraulic fracturing job. Thus, electronic system controls, such as the wireless flow controller 632, may adjust the delivery of proppant according to a dynamic or changing schedule of proppant demand that an operator may input, for example, at the blender tub 618. The operator may also be provided with override buttons to accelerate or delay the delivery of proppant to the surge hopper 616 there appears to be a growing problem with proppant rate overages or underages as may be visually assessed by an operator visually ascertaining the level of proppant in the surge hopper 616 if the system is allowing the problem to grow in an unresolved manner.

A centrifugal pump 640 discharges the proppant/frac fluid constituent mixture from within the blender tub 618 for downstream use in hydraulic fracturing operations. A flow meter 642 measures the flowrate of material from the centrifugal pump 640 and provides signals representative of the flow rate in line 626. A densitometer 644 measures the density of the proppant/frac fluid constituent mixture in line 626 provides signals representative of the density. The wireless flow controller 632 adjusts the speed of the centrifugal pump 640 to meet flow rate requirements as determined by the flowmeter 642 according to operator setpoints that may be established by design modeling of a particular hydraulic fracturing operation. Similarly, line 624 contains a centrifugal pump 646 under control of the wireless flow controller 632 for discharge of frac fluid constituents 620 into the blender tub 618. A flow meter 648 and densitometer 650 provide representative signals of the flow rate and density of the frac fluid constituents 620 in line 624 over time. A check valve 652 prevents backflow from occurring from the blender tub 618 into the frac fluid constituents 620. It will be appreciated that the components fully within box 656 may reside on a blender unit, while the other components of FIG. 6 may reside on a separate conveyor sled.

There is a mass or volumetric balance in the blender tub 618 such that the total amount of material discharged through line 626 should reflect a net of balance the incoming materials: (1) from the frac fluid constituents 620, and (2) the discharge from the metering conveyor assembly 622 into the blender tub 618. Thus, the wireless flow controller 632 is programmed to operate the motive mechanism 636 at a speed such that the discharge from metering conveyor assembly 622 is sufficient make up for the discharge of proppant through line 626. For standardization, a dry weight or volume of proppant may be used to drive this synchronicity. The wireless flow controller 632 may then cause the motive mechanism 628 to deliver proppant to the surge hopper 616 in volumetric synchronicity with the discharge from the metering conveyor assembly 622 into the blender tub 618. A level indicator 654 may override this synchronicity to accelerate or slow the discharge of materials into the blender tub 618 if the level of materials in the blender tub 618 rise or fall outside of a predetermined operational range.

Using signals from the load indicator 636 and the rotational velocity of the metering conveyor assembly 622, it is possible to calculate the rate of 'dry' proppant being delivered by the discharge of metering conveyor assembly 622 into the blender tub 618. For example, even where the proppant is wet sand, the dry weight of proppant may be calculated using Equation (4):

$$Q_s = V_{ws} \times \rho_s / t, \tag{4}$$

This assumes that any water in the wet proppant is entrained in the porosity of the proppant such that the presence of water does not alter the bulk volume of wet proppant as compared to dry proppant, where $Q_s$ is the approximate delivery rate for dry weight of proppant as weight per unit of time, $V_{ws}$ is the volume of wet proppant discharging into the blender tub 618 from the metering conveyor assembly 622, $\rho_s$ is the bulk density of the proppant when dry, and t is elapsed time required to the volumetric measurement $V_{ws}$. It is also possible to calculate the rate of water delivered to the blender tub 618 from the metering conveyor assembly 622 using Equation (5)

$$Qw = Qtot - Qs, \qquad (5)$$

where $Q_w$ is the rate of water being delivered by the metering conveyor assembly 622 expressed as weight per unit of time, and $Q_{tot}$ is the total rate of sand and water being delivered by the metering conveyor assembly 622 expressed as weight per unit of time. $Q_{tot}$ may be assessed by use of an empirically derived relationship that calculates $Q_{tot}$ as a function of the level of proppant in the surge hopper as determined by the level indicator 630, and the rotational velocity of the metering conveyor assembly 622. Alternatively, $Q_{tot}$ may be calculated as a function of conveyor rotational velocity and signals the load indicator 636 such that a percentage of the total load is deposited each time a volume that is defined by adjacent crossbars (e.g., crossbars 610, 612) are positionally deployed for discharge into the blender tub 618. It will be appreciated that weights may be converted to volumes when dividing by density, and that the wireless flow controller 632 may utilize calculations such as these when adjusting the flow of proppant to meet operator-established setpoints for flow rates and density of the blended frac fluid.

As shown in FIG. 6, the drag link device 605 is in coaxial alignment with the metering conveyor assembly 622, as determined by a common axis of elongation. In another embodiment (not shown), the elongate axis of the metering conveyor assembly 622 may be normal to the elongate axis of the drag link device 605. In other embodiments (not shown), the drag link device 605 may be replaced, for example, by the sand distribution assembly 400 shown in FIG. 4, the container support system 700 described below in FIG. 7, the conveyor sled assembly 800 as described in FIG. 8, or another proppant delivery system such as that described in copending application Ser. No. 15/264,352 filed Sep. 16, 2016 which is incorporated by reference to the same extent as though fully replicated herein. Generally speaking, these proppant delivery systems are constructed and arranged to move sand or other proppants from containers where the proppant resides towards a location for discharge from the proppant delivery system.

Figure 27:
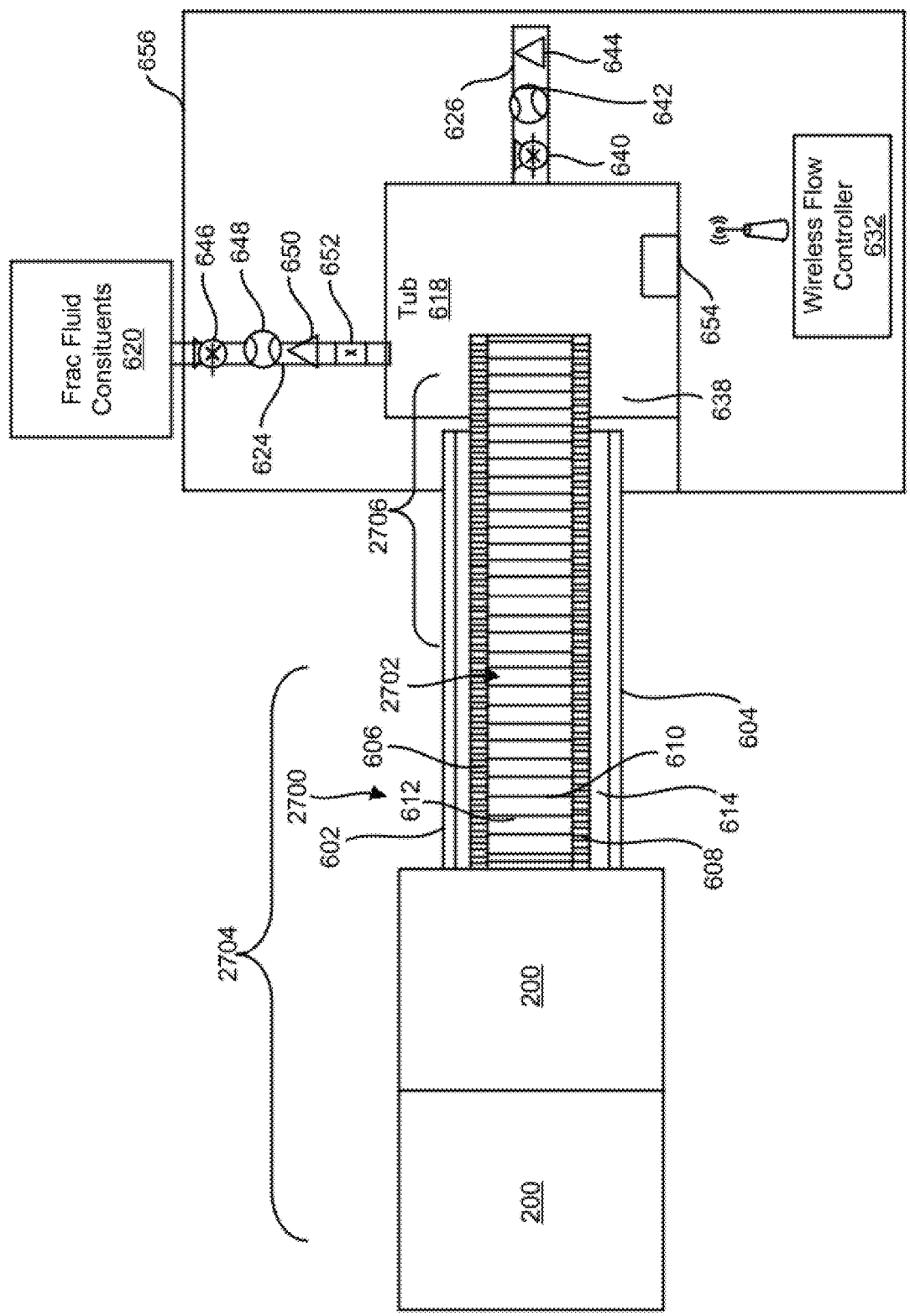
FIG. 27 shows an alternative drag link mechanism having an upwardly rising section.

FIG. 27 shows an alternative drag link system 2700. Like numbering of identical parts is retained with respect to the wet sand supply system 600 shown in FIG. 6. The drag link system 2700 differs from the wet sand supply system 600 in that the drag ling system 2700 lacks the surge hopper 616 and the metering conveyor 622 as are shown in FIG. 6. Moreover, a drag link device 2702 of FIG. 27 is modified with respect to the drag, link device 605 of FIG. 6. Designed primarily for the distribution of dry sand in support of a hydraulic fracturing operation, the drag link system 2702 has a horizontal component 2704 and a rising component 2706. The rising component 2706 rises upwardly from the level of horizontal component 2704 to a level that is suitable for discharge into the blender tub 618.

Vibratory Sleds

Figure 7:
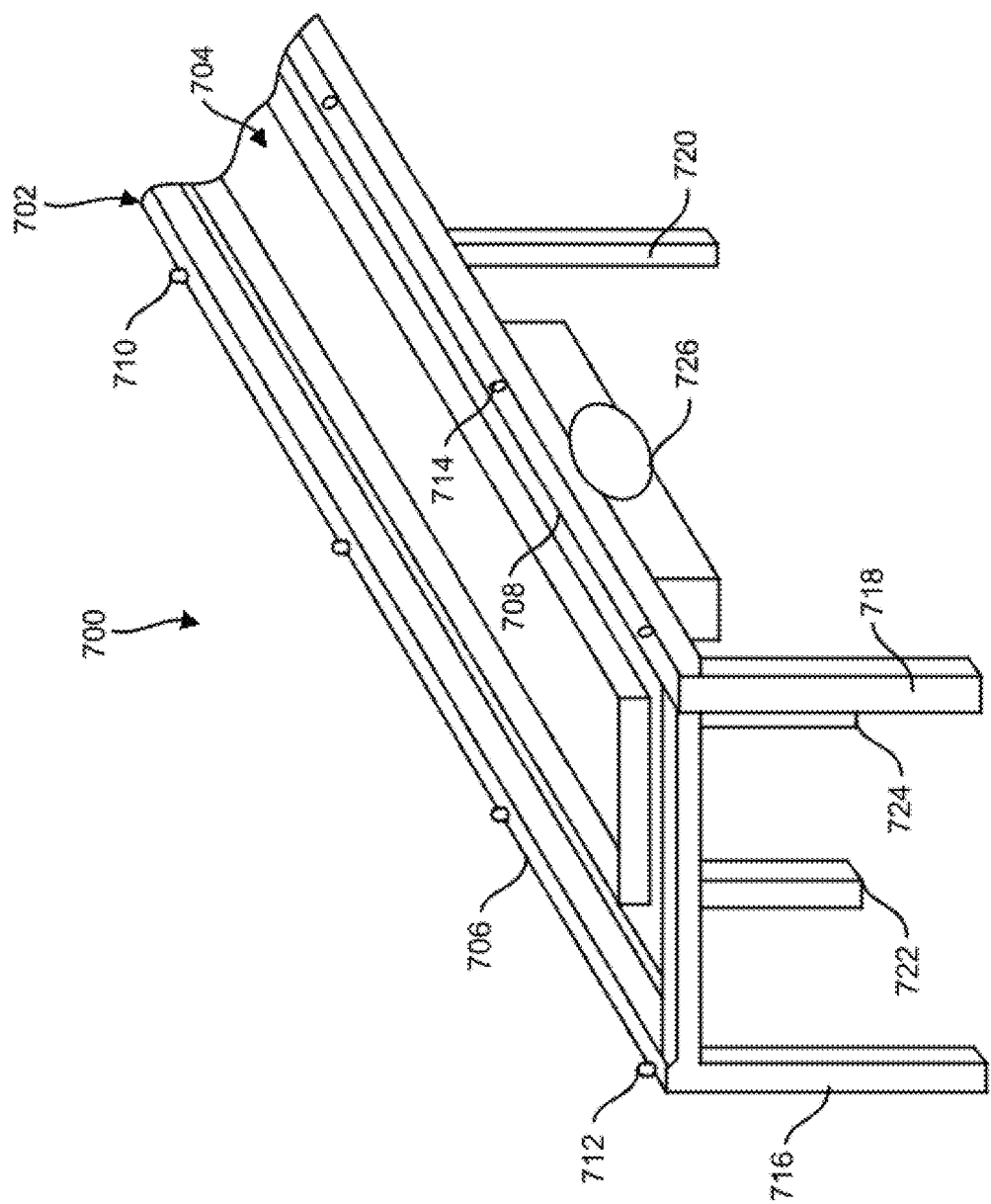
FIG. 7 shows a sand distribution system that is equipped with a vibrator mounted upon a stand that supports one or more proppant container.

FIG. 7 shows a container support sled 700 that has two main components, namely, a container support-stand 702 and a sand motive mechanism 704. The container support-stand 702 is isolated from the sand motive mechanism 704 so as not to cause excessive vibration therein. The container support-stand 702 includes rails 706, 708 with intermodal pins, such as pins 710, 712, 714, defining container loading areas. Legs 716, 718, 720 contact the ground and may be provided with screw-mounted leveling plates (not shown) where each leg meets uneven ground. While being designed for use of vibrations to assist wet sand dispensation, the container support system 700 may also be used to dispense dry sand.

The sand motive mechanism 704 is separately supported by legs 722, 724, and may be for example a conveyor belt or drag link system as described above. One or more vibrators 726, as described above, may be mounted on the rails 706, 708. The vibrator 726 is provided to facilitate the discharge of wet sand from containers mounted on the rails 706, 708. Thus, it is possible to utilize the container mounting stand 702 in cooperation with containers 200 (see FIG. 2) that have a vibrator 234 in like manner with container 200, or else the containers need no such vibrator and conventional containers may be utilized. The sand motive mechanism 704 may be, for example, a conveyor belt, a trough 422 for cycling slurry as shown in FIG. 4, or a drag link device as shown in FIG. 6. Isolating the sand motive mechanism 704 from vibrations beneficially reduces undue mechanical wear, metal fatigue, and disruption of electrical components in the sand motive mechanism 704.

Figure 28:
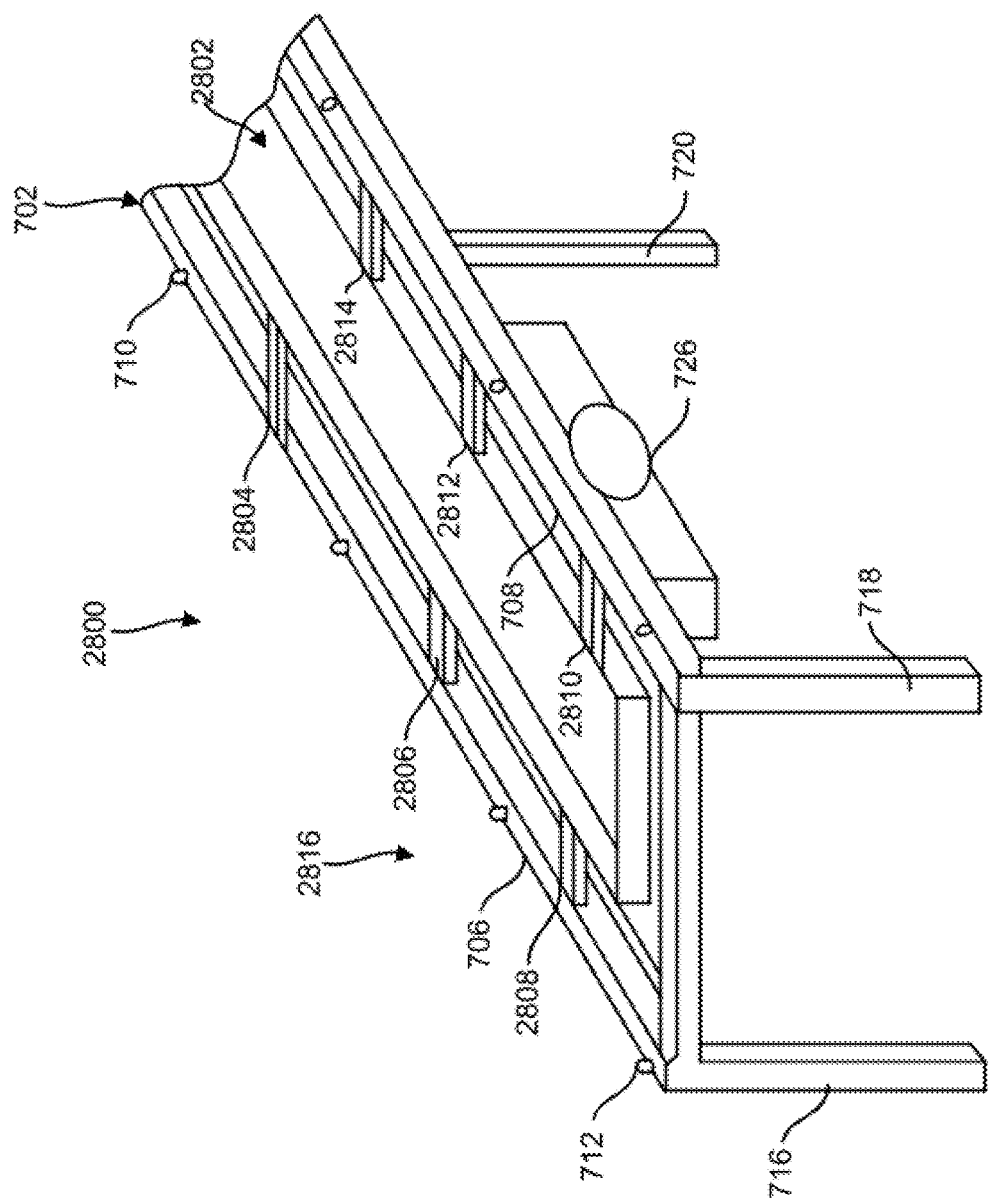
FIG. 28 shows an alternative sand distribution system in which a sand motive mechanism is supported by elastomeric links that function as dampers.

FIG. 28 shows support sled 2800 as an alternative embodiment to support sled 700 of FIG. 7. Like numbering of identical parts is retained in FIG. 28 with respect to FIG. 7. A sand motive mechanism 2802 differs from the sand motive mechanism 704 in that there are no legs 722, 724 (see FIG. 7) supporting the sand motive mechanism 2802. The sand motive mechanism 2802 is, instead, attached to the container support stand 702 by a plurality of elastomeric links 2804, 2806, 2808, 2810, 2812, 2914. The elastomeric links 2804-2814 deflect downwardly 2816 upon loading of the sand motive mechanism 2802 in the manner of a spring, while also serving as dampers that mitigate the passing of vibrations emanating from the vibrator 726 onto the sand motive mechanism 2802. The elastomeric links 2804-2814 may in some embodiments be replaced by springs, or there may be a combination of elastomeric links and springs in place of the elastomeric links 2804-2814. It will be appreciated that the vibrator 726 vibrates the container support stand 702, as well as any containers resting on the container support stand. 702, but that the elastomeric links 2804-2814 protect the sand motive mechanism from the full intensity of these vibrations.

In yet another alternative embodiment, the sand motive mechanism is rigidly affixed to the stand 702 such that vibrations readily transfer from the vibrator 726 to the sand motive mechanism 704. This may be accomplished, for example, by replacing the elastomeric links 2804-2814 with steel connectors.

Figure 8:
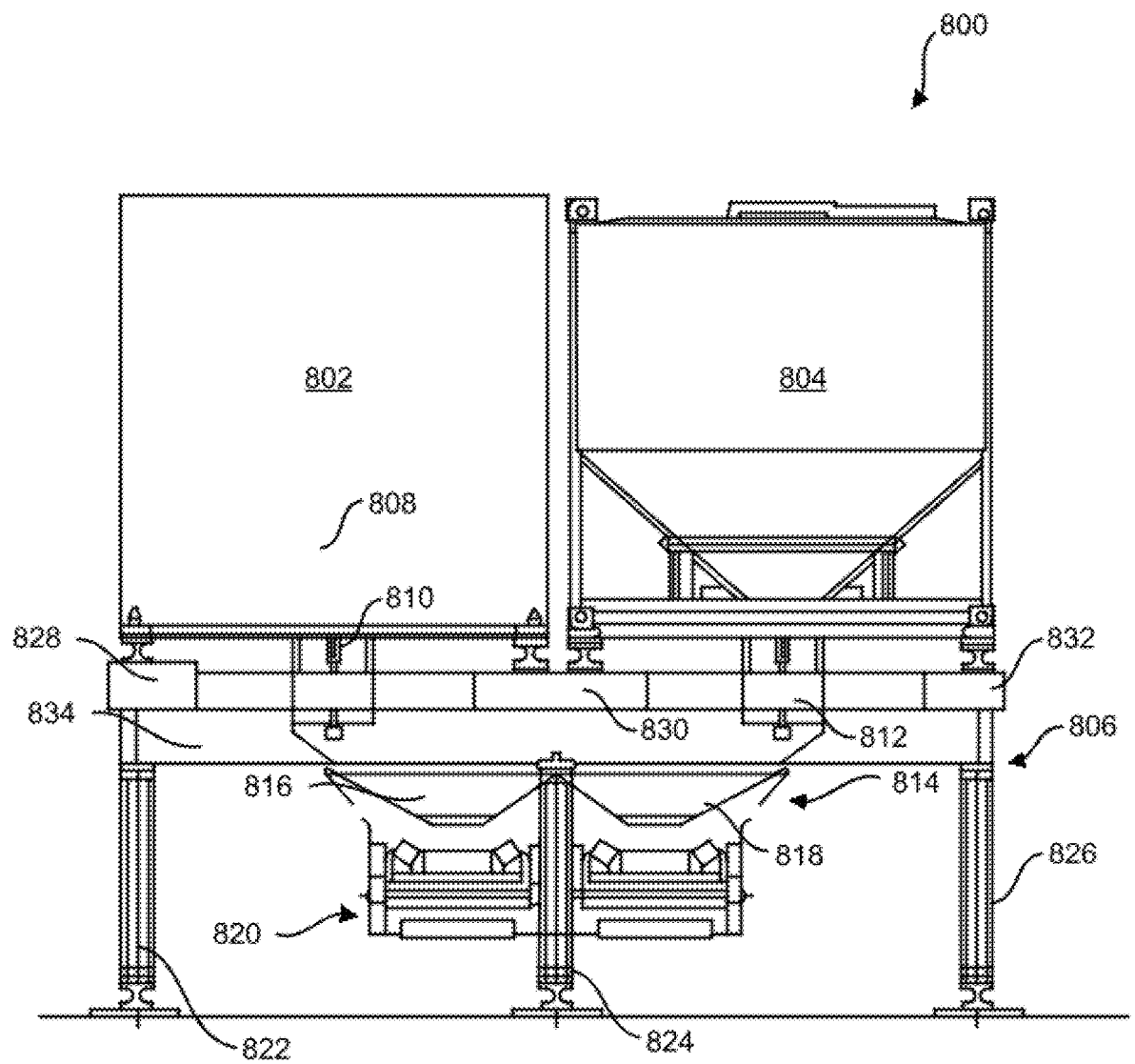
FIG. 8 shows a conveyor sled assembly that is used as a sand distribution system that is provided with a plurality of vibrator assemblies that facilitate distribution of wet sand onto a T-belt.

FIG. 8 shows a conveyor sled assembly 800 including two proppant containers 802, 804 mounted for discharge in parallel onto a conveyor sled 806. Wall 808 of container 802 is removed from container 804 for purposes of illustration. Hopper extensions 810, 812 respectively discharge into a flow diverter 814 that has nipples 816, 818 discharging sand onto a T-belt 820, which is a parallel conveyor belt system. Length adjustable legs 822, 824, 826 support the conveyor sled 806. The containers 802, 804 reside upon vibrator assemblies 828, 830, 832 which, in turn, are supported by beam 834. The legs 822, 824, 826 support beam 834 and leg 824 also provides direct support for the T-belt 820. The T-belt 820 operates as described in United States Patent Publication 2018/0065814 to Eiden et al, which is incorporated by reference to the same extent as though fully replicated herein. The conveyor sled assembly 800 as presently shown in FIG. 8 is, however, modified for improvement with respect to what is shown in Eiden et al. by the addition of vibrator assemblies 828, 830, 832 mounted on the conveyor sled assembly 800 beneath the containers 802, 804. Electronics (not shown) controlling the T-belt 820 are suitably ruggedized to withstand vibrations emanating from the vibrator assemblies 828, 830, 832. As described above, the vibrator assemblies have a system of eccentric weights to control the amplitude of vibrations, and they may be driven at different speeds to control the frequency of vibration. It will be appreciated that the vibrator assembly 830 is a single vibrator that contacts a plurality of containers 802, 804, whereas the vibrator assemblies 828, 830 each contact a single container 802.

Metering Conveyor

Figure 9:
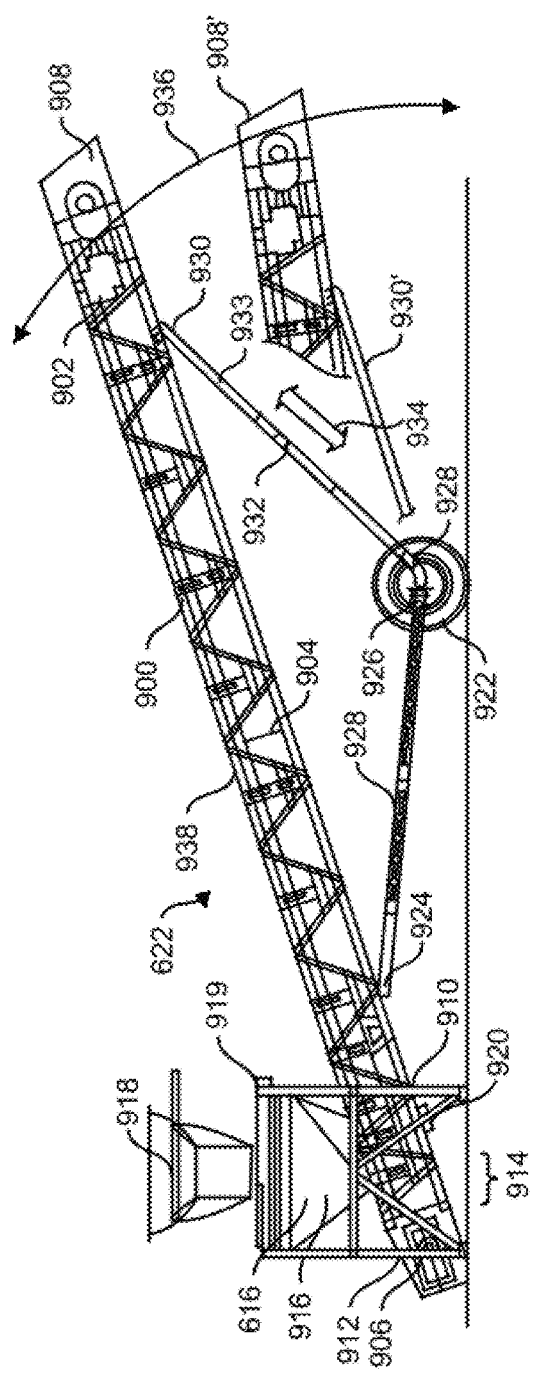
FIG. 9 shows an elevator or metering conveyor according to one embodiment for use in moving wet proppant.

FIG. 9 provides additional detail with respect to the metering conveyor 622 (see also FIG. 6) according to one embodiment. As shown in FIG. 9, the conveyor 622 is a standalone conveyor that includes an endless belt 900 which is driven at controlled speeds by an electric motor 902 functioning as the motive mechanism 636 discussed above. The metering conveyor 622 is mounted on an elongate frame 904 extending upwardly from a support nose 906 (proximate the surge hopper 616) to a discharge chute 908. The support nose 906 passes through openings 910, 912 in the surge hopper 616 to position the endless belt 900 in area 914 beneath a downwardly tapering hopper component 916 that receives proppant from proppant discharge mechanism 918 for transfer onto belt 900 in area 914. The proppant discharge mechanism 918 may be for example the sand distribution assembly 400 shown in FIG. 4, the drag link device 605 as described in FIG. 6, the container support system 700 as described in FIG. 7, the conveyor sled assembly 800 as described in FIG. 8, or another proppant delivery mechanism.

As shown in FIG. 9, the conveyor assembly 622 has an elongate axis running from the support nose 906 to the discharge chute 908, and this elongate axis is perpendicular to the elongate axis (not shown) of the proppant discharge mechanism 918. The respective axes may also be in parallel. The conveying mechanism shown in FIG. 9 preferably meters the flow of the wet or fluidized sand within 1-5% accuracy using belt scales below the surge hopper 616 as to provide a consistent flow of product to the blending unit on the basis of averaging the weight in motion over time. The speed of the belt 900 may be governed by output from the mass flow controllers 464, 632, as described above, to adjust the speed of the belt adjustments. The flow controllers 464, 632 may also adjust the rate of discharge from the discharge mechanism 918 as needed to meet job requirements at a blending unit (not shown). An optional sand shaker or buzz screen 919 may be provided to assure that the proppant does not have rocks, bolts, roots, or other large foreign items that might ruin downstream blending boost pumps or pumping equipment. The ability of the metering conveyor to weigh the load of proppant facilitates downstream mixing of frac fluids to meet design parameters for a hydraulic fracturing operation.

Figure 10:
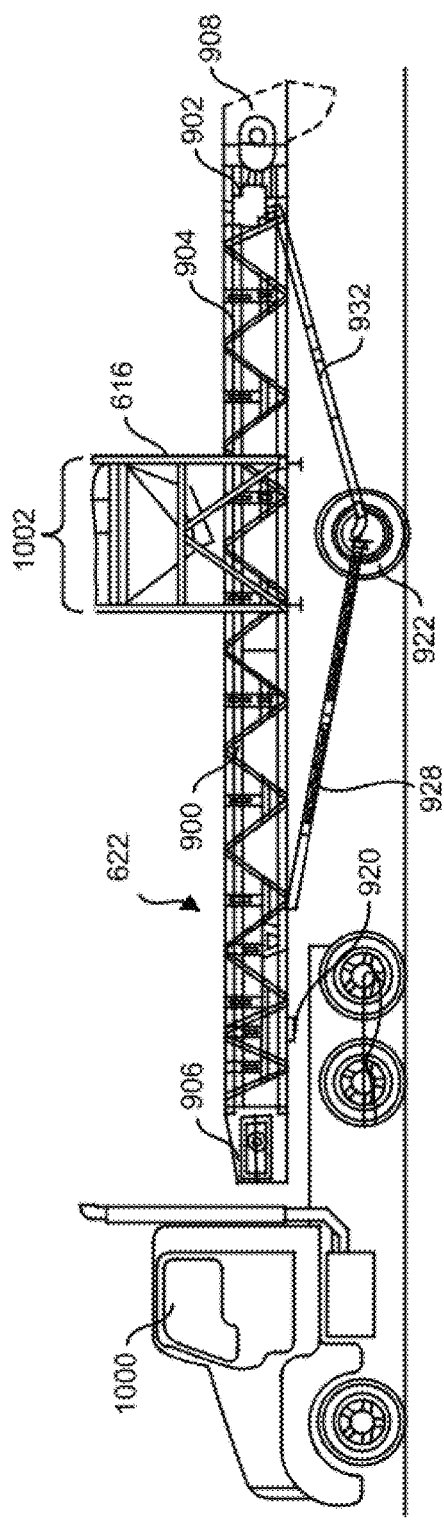
FIG. 10 shows the metering conveyor in a roadable state.

The elongate frame 904 includes a fifth wheel connector 920, and is carried upon axle assembly 922, which is shown in FIGS. 9 and 10. The elongate frame 904 and axle assembly 922 are coupled to one another through pivots 924, 926, connecting a rigid pole 928 between the elongate frame 904 and axle 922, together tubular member with pivots 928, 930 containing an extensible hydraulic cylinder 932 in a telescoping pole 933 between the elongate frame 904 and the axle assembly 922. The rigid pole 928 and hydraulic cylinder may be provided in tandem (in parallel pairs) to enhance lateral stability across the frame 904. Extension/retraction 934 of the extensible hydraulic cylinder 934 causes the discharge chute 908 to pivot about the support nose 906, generally along arc 936. Locating the axle in a position that resides further towards the discharge chute 908 than is the center of gravity 938 for the elongate frame 904. This location assures that the discharge chute 908 will pivot up and down along arc 936. This pivoting raises and lowers the position of discharge chute 908 to a height that is suitable for discharging proppant into a blender tub, such as the blender tub 618 shown in FIG. 6.

FIG. 10 shows the metering conveyor 622 in a horizontal configuration presenting a roadable state and is connected to truck 1000 for road transport. In the roadable state as depicted, the surge hopper 616 is relocated to a mounting position 1002 above the axle 622. The mounting structure may be, for example, an intermodal pin and receiver structure or bolts (not shown) that retain the surge hopper 616 in position 1002.

Control Logic

Figure 11:
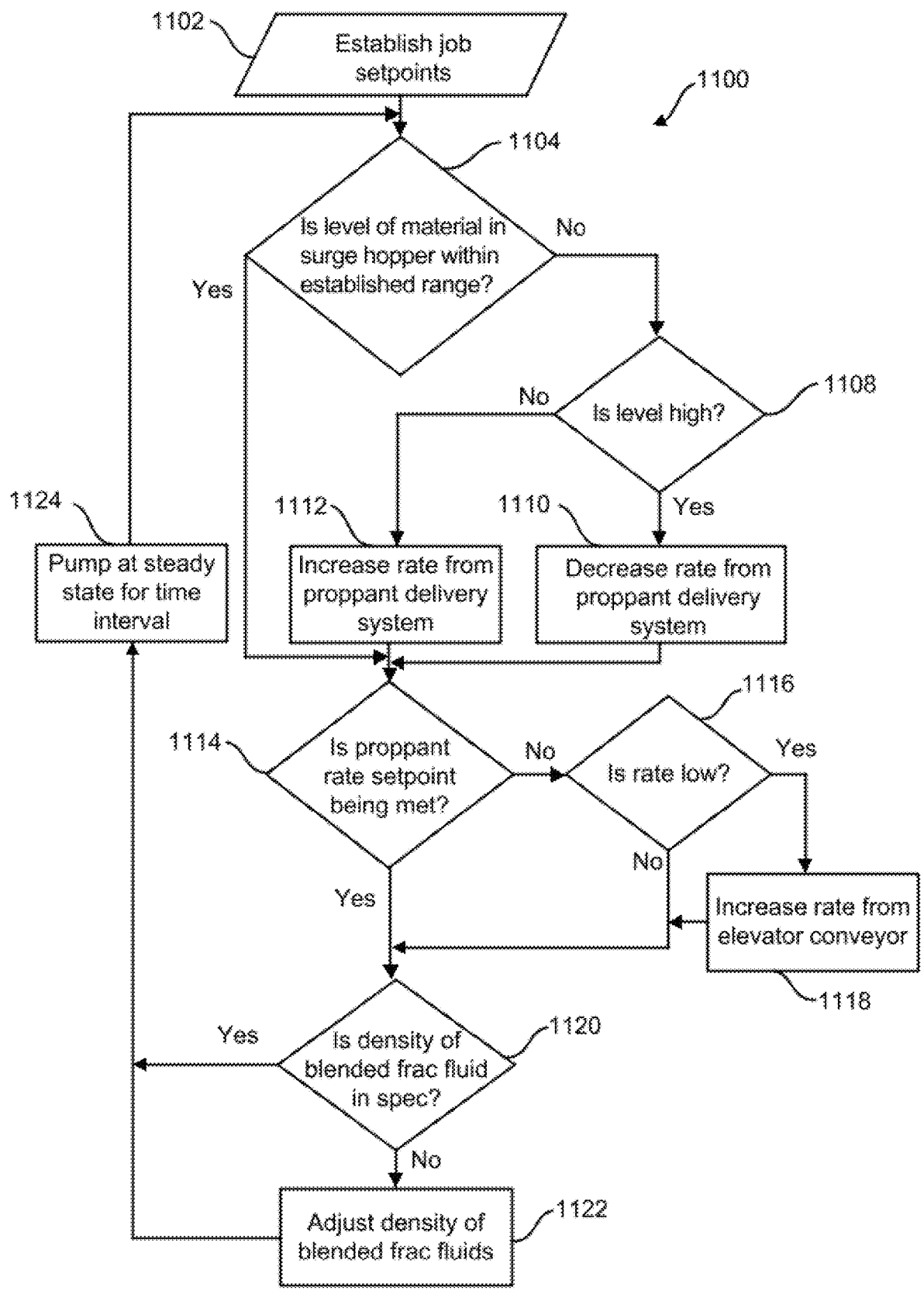
FIG. 11 is a diagram of programmable logic that may be used by a flow controller to drive various components of sand moving equipment in synchrony according to rate and density setpoints for a hydraulic fracturing job.

Generally speaking, the metering conveyor 622 is provided with electronic controls that take operator inputs and set points from the blender and make the adjustments to belt speed in order to meet these setpoints. The metering conveyor 622 is, accordingly, able to communicate with the system elements described in FIGS. 4,6,7,8 to control the speeds of discharge of the sand into the surge hopper 616. FIG. 11 shows program logic 1100 that may be utilized in the memory and processor of the wireless flow controller 632 according to one embodiment for maintaining proppant rate synchrony as discussed above while also maintaining quality of blended frac fluid exiting the blender tub 618. Before the hydraulic fracturing job can begin, it is desirable to establish 1102 setpoints for the job. The setpoints include data that is normally provided in the performance of a hydraulic fracturing operation, such as pumping pressures, flow rates of the frac fluid, constituents of the frac fluid, and limits for a particular stage of pumping. Thus, for example in a slick water frac operation, the setpoints may include the rate of proppant being pumped, pressure downstream of the pumping unit, and frac fluid density, as well as any other data that is used in performing a hydraulic fracturing operation. These setpoints may be determined by the use of modeling as described above.

The program operates upon sensors mounted on the surge hopper 616 as described above to determine 1104 whether the level of material in the surge hopper 616 is within an established range of values. As explained above, this range of values may vary by design, but exists within a range that is suitable for use as a buffer such that there may be a temporary imbalance of proppant rate synchrony assessed as input to and discharge from the surge hopper 616. If the level is outside this range, the program determines 1108 whether the level is too high. If so, then the program causes the wireless flow controller 632 to decrease 1110 the rate of proppant being delivered to the surge hopper 616. This may be done, for example, utilizing an experiential-based empirical correlation of parameters affecting the rate of proppant delivery. If the level within the surge hopper 616 is not too high 1108, then the wireless flow controller 632 increases 1112 the rate of proppant delivery.

The program next inquires 1114 whether the proppant rate setpoint is being met. If not, the program inquires 1116 whether the current rate of proppant delivery is below the setpoint. If so, the program causes the wireless flow controller 632 to increase 1118 the rate of proppant that is being carried from the surge hopper 616 along the metering conveyor 622. This increase may be provided, for example, as a rate adjustment determined by use of an experiential-based correlation that relates the rate of proppant being carried by the metering conveyor 622 to one or more such parameters as power consumed by the belt motive mechanism 636, or rotational velocity or the belt motive mechanism of the belt.

The program next inquires 1120 whether the blended frac fluid exiting the blender tub 618 meets the density setpoint. If not, then the program causes the wireless flow controller 632 to adjust 1122 the density of the blended frac fluid within the blender tub 618 to meet the setpoint. This may be done, for example, by calculations assuming the proppant delivery rate will hold constant and then adding more or less of the frac fluid constituents 630 as needed for the density adjustment. With these adjustments being made, all pumps of the system are operated at a steady state 1124 for an interval of time that is sufficient to avoid flow adjustments that are too rapid in nature, but which in the case of a continuing lack of synchronicity also avoids overcharging the surge hopper 616 such that spillage occurs or undercharging the surge hopper 616 such that an insufficient amount of proppant is being delivered to the metering conveyor 622.

Pneumatic System

Figure 12:
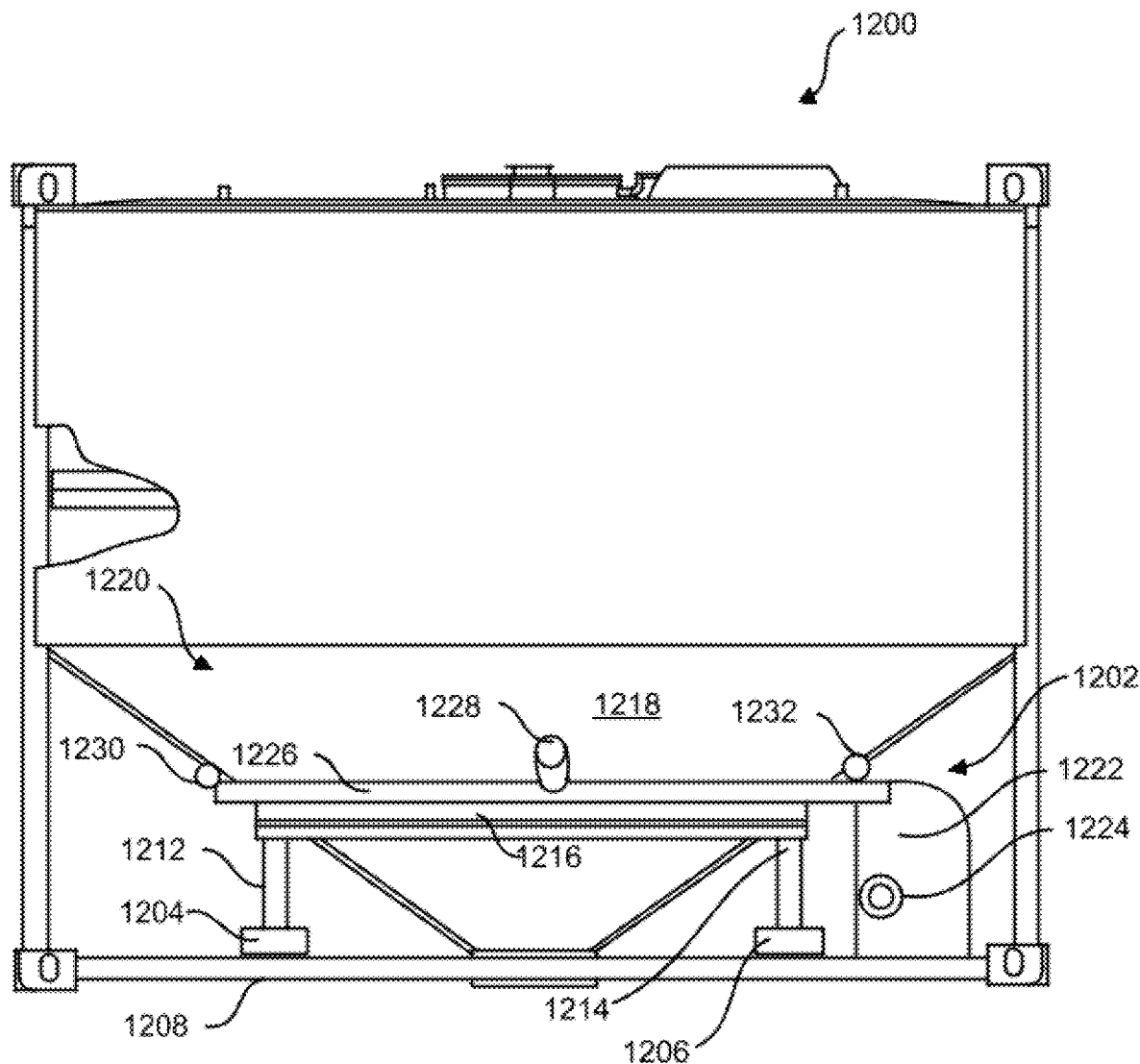
FIG. 12 shows a proppant container with a hopper that is fitted with umbrella valves to facilitate discharge of wet sand.

FIG. 12 shows a proppant container 1200 that is modified with respect to the proppant container 200 of FIG. 2. In place of the vibrator assembly 234 as shown in FIG. 2, the container 1200 is provided with a pneumatic system 1202. The pneumatic system 1202 may be purpose-built for use on new proppant containers, or else it may be provided as a retrofit assembly used to improve existing containers. The container 1200 has forklift tubes 1204, 1206 that are welded to cross-member 1208. Risers 1212, 1214 extend upwardly from the forklift tubes 1204, 1206 to support a rectilinear frame 1216 that contacts four walls 1218 (only one is shown in FIG. 12) of a descending pyramidal hopper 1220 that discharges through opening 1222. It will be appreciated that there may be a total of four risers such as risers 1212, 1214, and that two of them are hidden from view from the perspective of FIG. 12.

The pneumatic system 1202 includes a compressed air tank 1222 with a quick-connect air fitting 1224. The air tank 1223 discharges to a pneumatic rail 1226 that supplies compressed air to disk fluidizers 1228, 1230, 1232. While this embodiment presents at least one disk fluidizer on each wall, the actual number needed will be based on the type of disk fluidizer and the energy needed to start and maintain proppant flow. The disk fluidizers 1228, 1230, 1232 pass through the respective walls 1218 to discharge air into the interior of the container proximate the interior wall surfaces thereof (not shown). Suitable disk fluidizers may be purchased on commercial order, for example, as "Disk Fluidizers" from Solimar Pneumatics of Minneapolis, Minn. These disk fluidizers are hereby defined to be in the class of umbrella valves.

Figure 13:
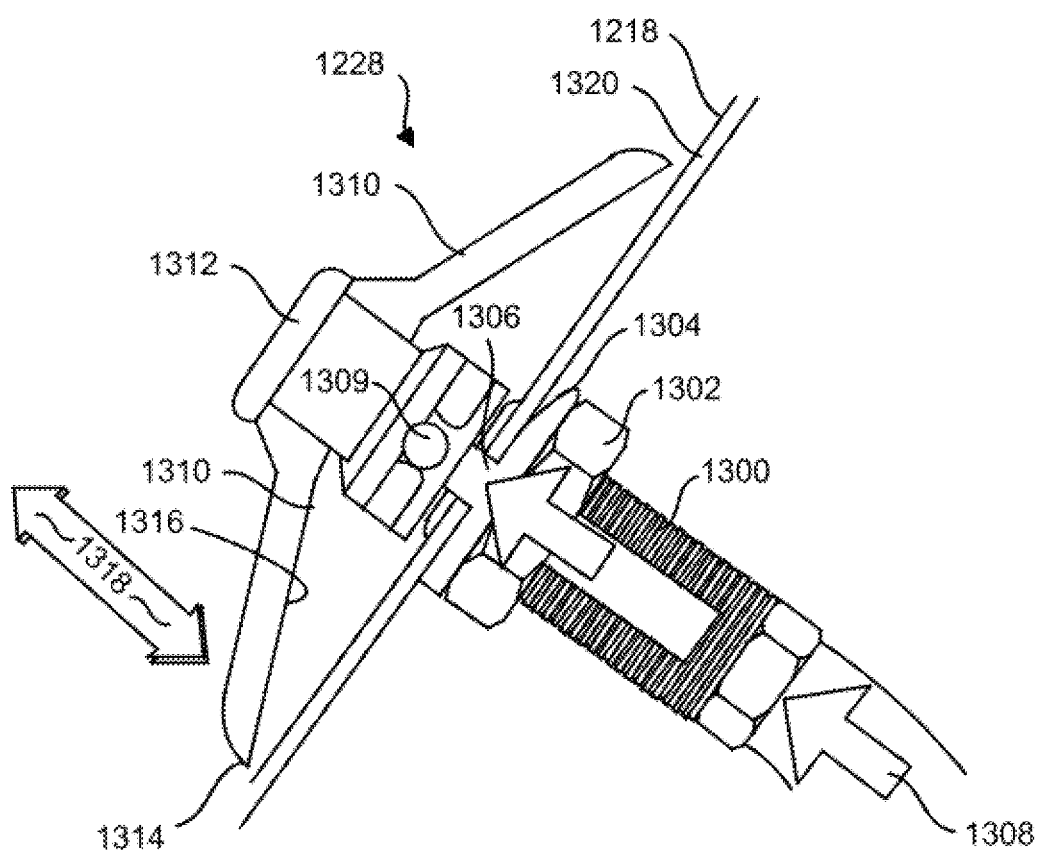
FIG. 13 shows an umbrella valve.

FIG. 13 shows the disk fluidizer 1228 in expanded detail. An exteriorly threaded hollow valve body 1300 passes through wall 1218. Nut 1302 secures the valve body 1300 in place. A gasket 1304 seals against the flow of air through opening 1306. The valve body 1300 permits passage of air 1308 (from tank 1222) towards nozzle 1309, which redirects the air 1308 generally parallel to wall 1218. An elastomeric cup 1310 has generally a frustoconical shape that is generally concave facing the wall 1218. The elastomeric cup 1310 compressively retained on valve head 1312. The elastomeric cup 1310 transiently forms a compressive seal against wall 1218 at periphery 1314. Upon exiting nozzle 1309, the air 1308 acts upon inner surface 1316 with sufficient force to disrupt the transient seal at periphery 1314. In the intended environment of use, this disruption causes the elastomeric cup to vibrate 1318 up and down. The vibration 1318 works together with the flow of air to dislodge wet sand form the face 1320 of wall 1218. Sand that is dislodged in this manner is then able to discharge from the hopper 1220 (see FIG. 12). When the air 1308 is not flowing, the elastomeric cup 1310 prevents sand from clogging the nozzle 1304.

It will be appreciated that the aforementioned disk fluidizer system renders obsolete silo-based proppant drying systems as described in U.S. Pat. No. 10,017,686 to Babcock et al. which is incorporated by reference to the same extent as though fully replicated herein. This is because the disk fluidizer system is not intended to render the proppant bone dry as taught by Babcock et al. Accordingly, proppant silos may be fitted as described above with vibrator assembles and/or disk fluidizers for the purpose of dispensing wet sand, as opposed to the purpose of drying sand or another proppant. In one example of this type of arrangement, it is possible to have a silo acting as the proppant discharge mechanism 918 (see FIG. 9) discharging wet sand directly into the surge hopper 616.

Knife Edge Gate

Figure 14:
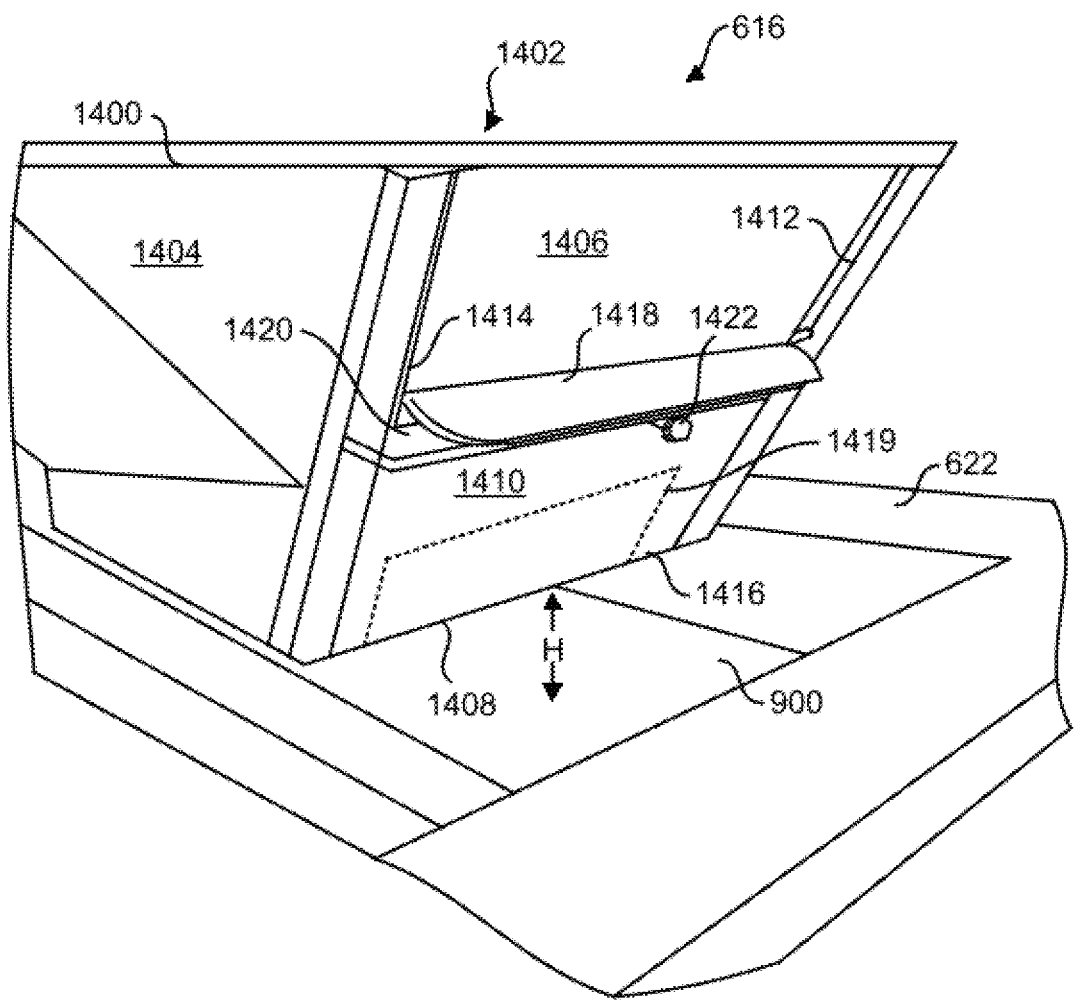
FIG. 14 shows a surge hopper configured with a knife-edge gate used to produce a ribbon of sand having a substantially uniform thickness on a conveyor belt.

FIG. 14 provides additional detail with respect to the surge hopper 616 according to one embodiment. A hopper element 1400 has a top opening 1402 for receipt of proppant therethrough. Walls 1404, 1406 taper towards a bottom opening 1408 that discharges onto a separate conveyor belt 900. A plate 1410 is slidably received at opposite ends in channels 1412, 1414 such that sliding motion of the plate 1410 within channels 1412, 1414 varies the height H of bottom edge 1416 above the belt 900. Thus, the position of bottom edge 1416 assures that a ribbon of proppant (not shown) of a predetermined uniform thickness H will exit the hopper element 1400 atop belt 900. The plate 1410 is attached to a forwardly extending shelf member 1418 that is provided for ease of manual adjustment, and at least partially covers an opening 1419 in wall 1406 to vary the amount of this opening that is available for the flow of proppant. A brace 1420 extends between the channels 1412, 1414, and carries bolt 1422 which may be tightened for compression against the plate 1410 to lock the plate 1410 in a fixed position for maintenance of the height H. The plate 1410 in this locked position may be referred to herein as a knife edge gate. In operation, the knife edge gate produces a uniform ribbon of wet or dry sand of consistent thickness H, which assists in metering for purposes of flow control as described above.

Use of the knife edge gate described above enables easy calculation of volumetric rates for purposes of flow control as described above. This is because the uniform has a fixed width and a uniform height, which means that the volumetric flow rate is a function of the belt velocity, i.e.:

$$V_s = H \times W \times V_b \times t \qquad (6)$$

where $V_s$ is the bulk volume of sand, H is the ribbon height, W is the ribbon width, $V_b$ is the linear velocity of the belt, and t is time.

It will be appreciated that the surge hopper 616, when optionally equipped with the vibrator 1628, may be provided as a standalone piece of equipment that when in use does not physically contact any other equipment as a way to protect other equipment from vibration.

Figure 15:
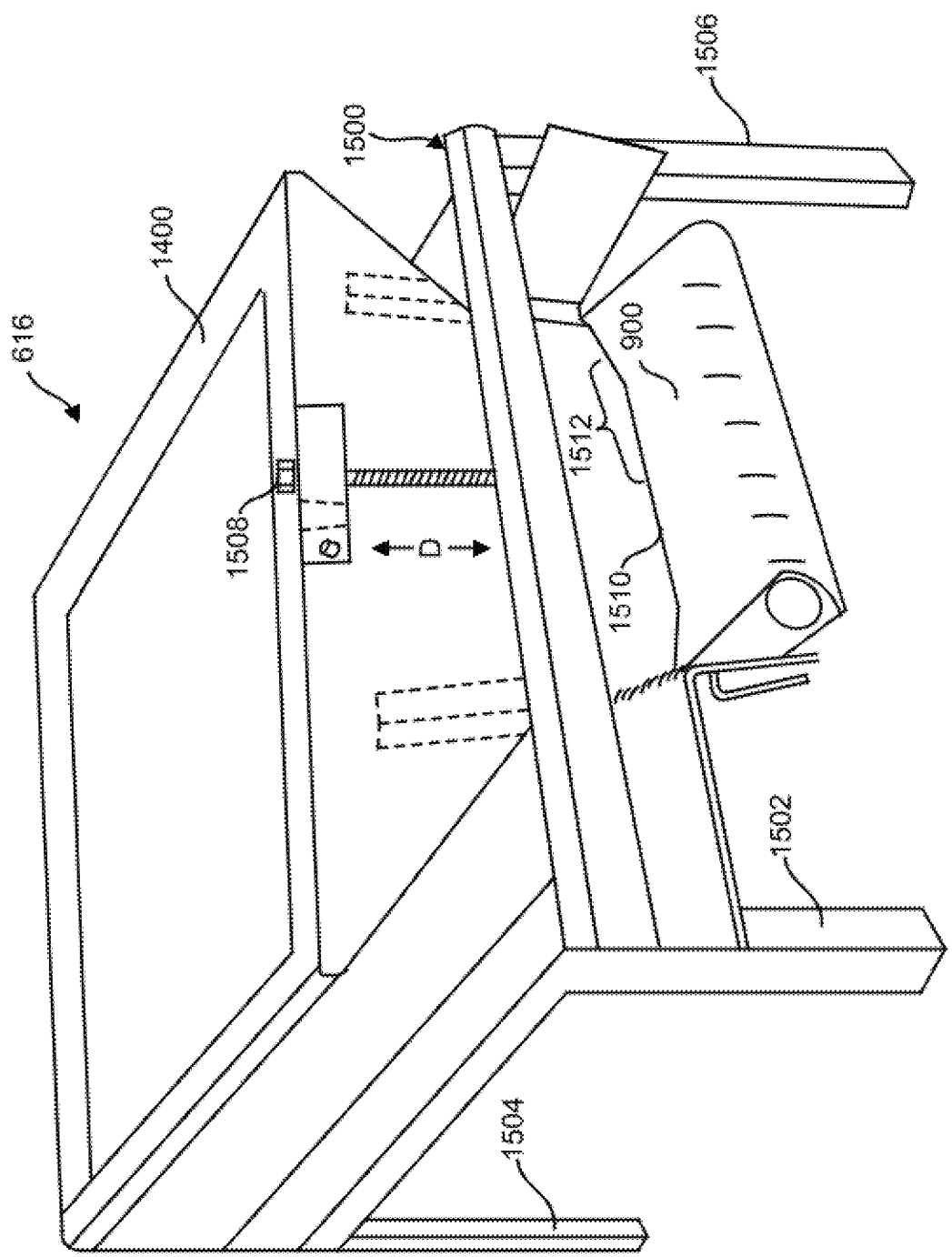
FIG. 15 shows the rear of the surge hopper equipped with a height adjustment mechanism.

FIG. 15 shows the surge hopper 616 from a rear perspective. The hopper element 1400 is supported in position over the belt 900 by a frame 1500 with ground-contacting legs 1502, 1504, 1506. A screw assembly 1508 is used to alter a distance D for selective positioning of bottom edge 1510 above the belt 900. The tolerance of the resulting junction 1512 between the bottom edge 1510 and the belt 900 is preferably sufficient to prevent significant leakage of proppant, such as a gap a gap that is 1/32, 1/16, 1/8, or 1/4 inch.

Figure 29:
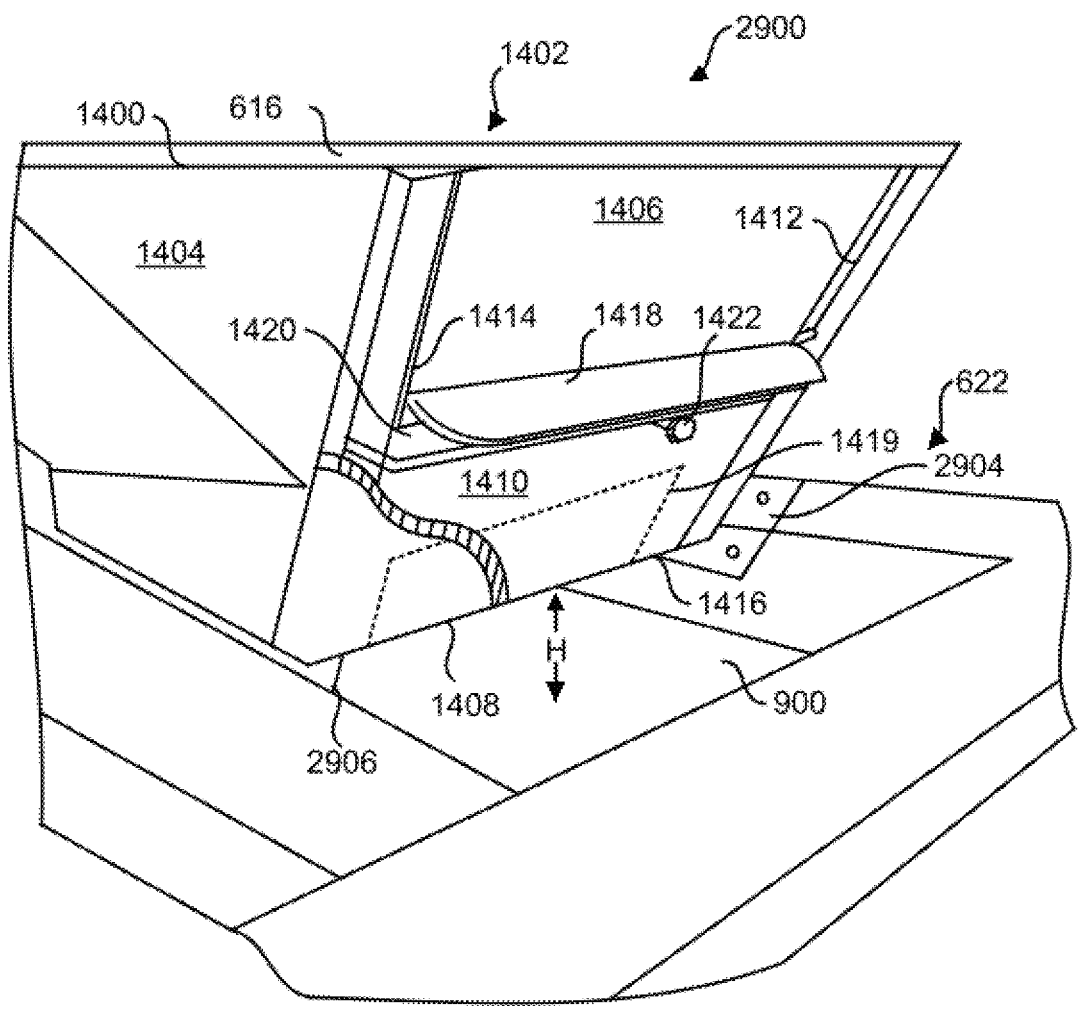
FIG. 29 shows an alternative knife edge gate assembly mounted on a conveyor sled to produce a ribbon of sand having a substantially uniform thickness on a conveyor belt.

FIG. 29 shows an alternative knife edge gate assembly 2900. As shown in FIG. 29, portions of the plate 1410 and channel 1414 are removed for purposes of illustration to reveal the opening 1419 in wall 1406 residing behind the plate 1410. In this embodiment, the channels 1412, 1414 are not mounted on the surge hopper 616. The channels 1412, 1414 are, instead, attached to the metering conveyor 622 by the use of L-brackets 2904, 2906 such that the plate 1410 resides in close proximity to the wall 1406 and is able to control the ribbon of sand emanating from opening 1419.

It will be appreciated that unprocessed sand which has been freshly mined may be wet or dry, and that conventionally the sand is dry. Therefore, the improvements to sand distribution equipment also contemplate dust mitigation attributes as described below.

Dust Mitigation

Mist Sprayer Assembly

Figure 16:
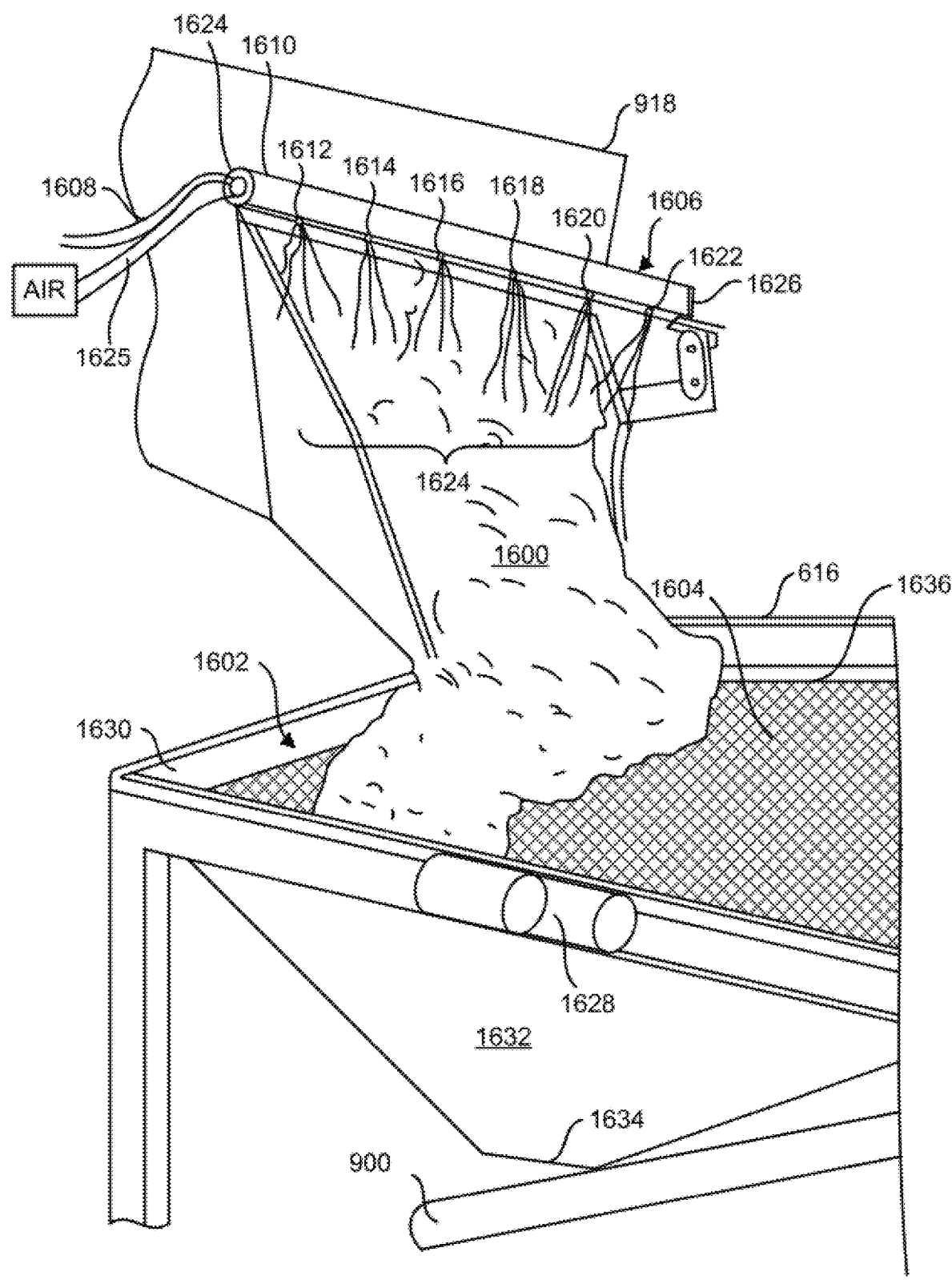
FIG. 16 shows a discharge chute including a mist sprayer assembly for dust mitigation when transferring proppant into the surge hopper.

FIG. 16 provides additional detail with respect to the proppant discharge mechanism 918 according to one embodiment. The proppant discharge mechanism 918 is fed by a conveyor belt or drag link mechanism as described above, and discharges proppant 1600 into a top opening 1602 of the surge hopper 616. The proppant may be wet or dry. The top opening 1602 is covered with a wire mesh 1604 to remove stones and other debris that may hinder operation of a frac pump (not shown). As shown in FIG. 16, the proppant discharge mechanism 918 is improved by the addition of a mist sprayer assembly 1606 for dust mitigation. A tubular member 1608, which may be a pipe or a hose, carries pressurized water to a tubular body 1610 that discharges water from misting heads 1612, 1614, 1616, 1618, 1620, 1622. Water exiting the misting heads 1612-1622 forms a mist zone 1624 that slightly wets the proppant 1600. The water in mist zone 1624 also congeals on airborne dust particles in the mist zone 1624, with the effect of causing the dust to fall out of the air and down onto the proppant 1600 as the proppant 1600 passes through the wire mesh 1604. Thus, the mist zone 1624 preferably has an extent that will capture airborne dust particles anywhere above the opening 1602. The tubular member 1610 is sealed at ends 1624, 1626 to increase misting by a boost of internal pressure. The mist zone 1624 forms a barrier that captures dust emissions in the atmosphere and may, for example, be emitted by misting heads having a central axis of discharge pointed in a direction ranging from 30° to 90° relative to horizontal. While an atomized mist is preferred, the misting heads 1612-1622 may be replaced with spray heads that emit a spray of water that is not atomized. Generally speaking, the amount of water introduced to the proppant 1600 through mist zone 1624 is negligible. It will be appreciated that the mist sprayer assembly 1610 may be replicated on the discharge chute 908 metering conveyor 622 (see FIG. 9) or anywhere that there is an exchange or other movement of proppant exposed to air.

The misting heads 1610-1622 are optionally but preferably of the type known as atomizers or foggers. This type of spray head emits water in the form of what appears to the eye as a fog and may utilize a compressed air supply 1625 to enhance the quality of the fog. Spray heads of this type are sold commercially, for example, as the FloMax® Air Atomizing Nozzles by Spraying Systems Co. of Hamburg, Germany. These nozzles may be made individually to emit water at rates of from 0.03 to 0.25 gallons per minute (0.11 to 0.94 liters per minute), 0.05 to 0.5 gallons per minute (0.19 to 1.89 liters per minute), 0.5 to 1.5 gallons per minute (1.89 to 5.67 liters per minute), 0.7 to 7 gallons per minute (2.6 to 26.5 liters per minute), 1.3 to 13 gallons per minute (4.9 to 49.2 liters per minute), and 10 to 30 gallons per minute (38.7 to 114 liters per minute). The spray head assembly preferably includes at least one atomizing spray head and may include a combination of pneumatically driven foggers and misters.

Optionally, a vibrator 1628 may be attached to the surge hopper 616 to assist in shaking of the wire mesh 1604 to facilitate the flow of proppant 1600 therethrough. As shown in FIG. 16, the surge hopper 616 has a frame 1630 supporting four sidewalls 1632 that taper downwardly towards a bottom discharge opening 1632, the sidewalls defining an interior flow passageway from the top opening 1602 to the bottom discharge opening 1634. The wire mesh 1604 is located at the top opening 1602 and preferably has a screen size that prevents rocks and other debris from passing through the wire mesh 1604 if the debris has a size that would interfere with the operation of frac pumping units (not shown) downstream of the surge hopper 616. This is preferably a mesh size that removes debris having a diameter larger than 1/2 inch and preferably the mesh size removes debris with a diameter larger than 1/4 inch or 1/8 inch. Generally speaking, the mesh size should remove any debris that will interfere with intake valves of a frac pump, which is normally in the range of debris having a minimum dimension ranging from about 1/16 to 1/2 of an inch, and preferably from 1/8 to 1/4 inch. Suitable mesh sizes may be, for example, a U.S. mesh of from 2 to 14, and this is preferably a U.S. mesh size of from 3 to 6.

Figure 17:
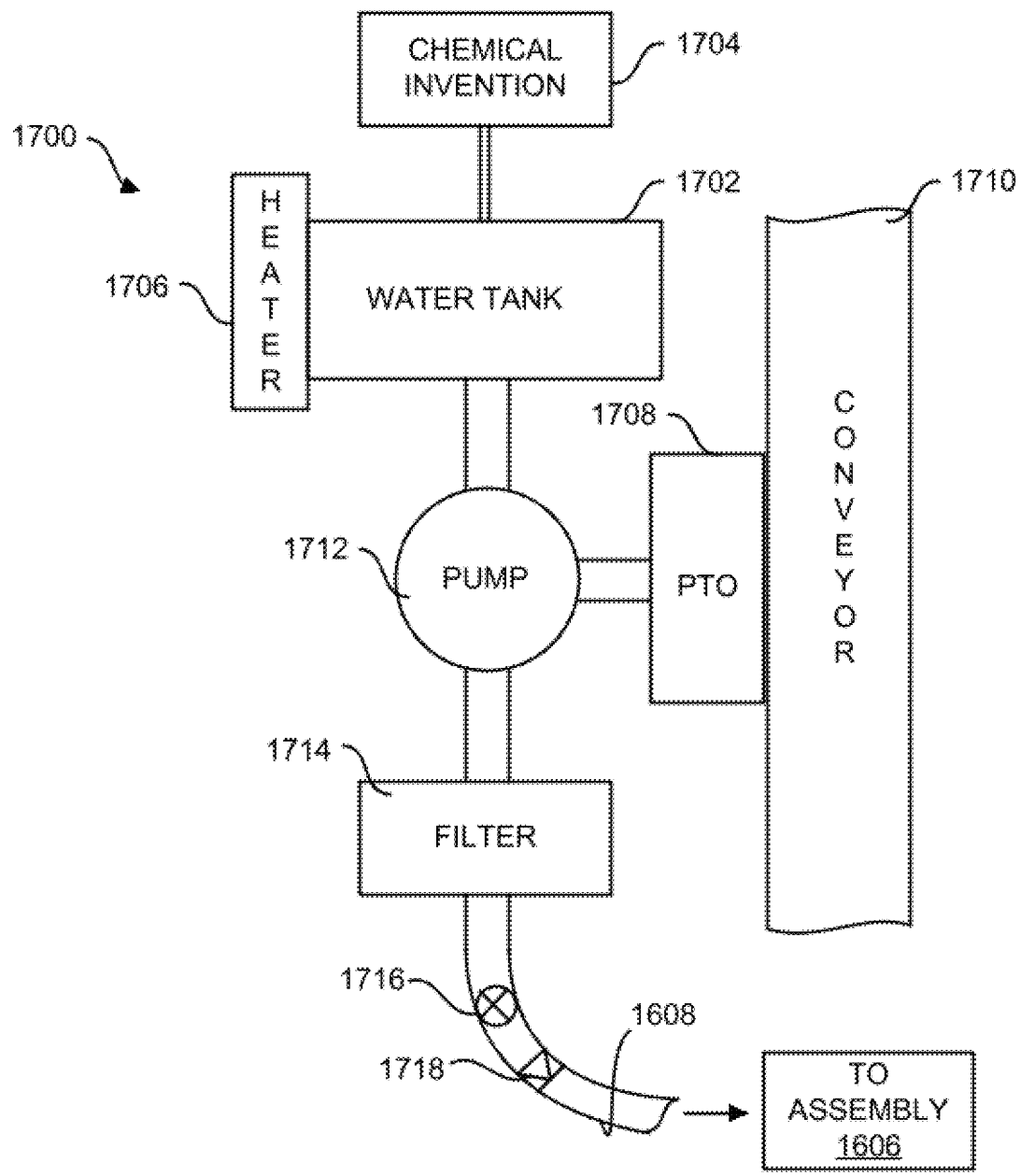
FIG. 17 shows a water processing system for the mist sprayer assembly.

While FIG. 16 shows the vibrator 1628 mounted on the frame 1630, alternative options for mounting the vibrator 1628 include a sidewall location 1638 and/or a wire mesh location 1640. It will be appreciated that, when the vibrator 1628 is mounted on the wire mesh 1604, the frame 1628 and sidewalls may be isolated from vibration by the use of an optional elastomeric damper 1636 Moreover, since the surge hopper 616 is a standalone device, FIG. 17 shows a water processing system 1700 for the treatment of water before the water enters the mist zone 1624. Water resides in a water tank 1702 and may be optionally treated by chemical injection 1704, for example, by the addition of antifreeze or rust preventatives. The water tank 1702 is optionally heated by the provision of a heater 1706 in cold climates where the water would otherwise freeze. A power takeoff 1708 receives power from a conveyor belt 1710, which may be used to distribute or transport proppant for; purposes of hydraulic fracturing as described above. A pump 1712 receives power from the power takeoff 1708 to pressurize water from the tank 1702. The water from pump 1712 optionally passes through filter 1714 and then passes into hose 1608 for delivery to the mist sprayer assembly 1606 (see FIG. 16). A valve 1716 may be adjusted to control the pressure inside the hose 1608, and so also the rate of water being emitted from the spray head assembly 1606. A check valve 1718 prevents backflow of water, for example, as might otherwise be caused by an influx of air from the air supply 1625 (see FIG. 16).

Baghouse

Figure 18:
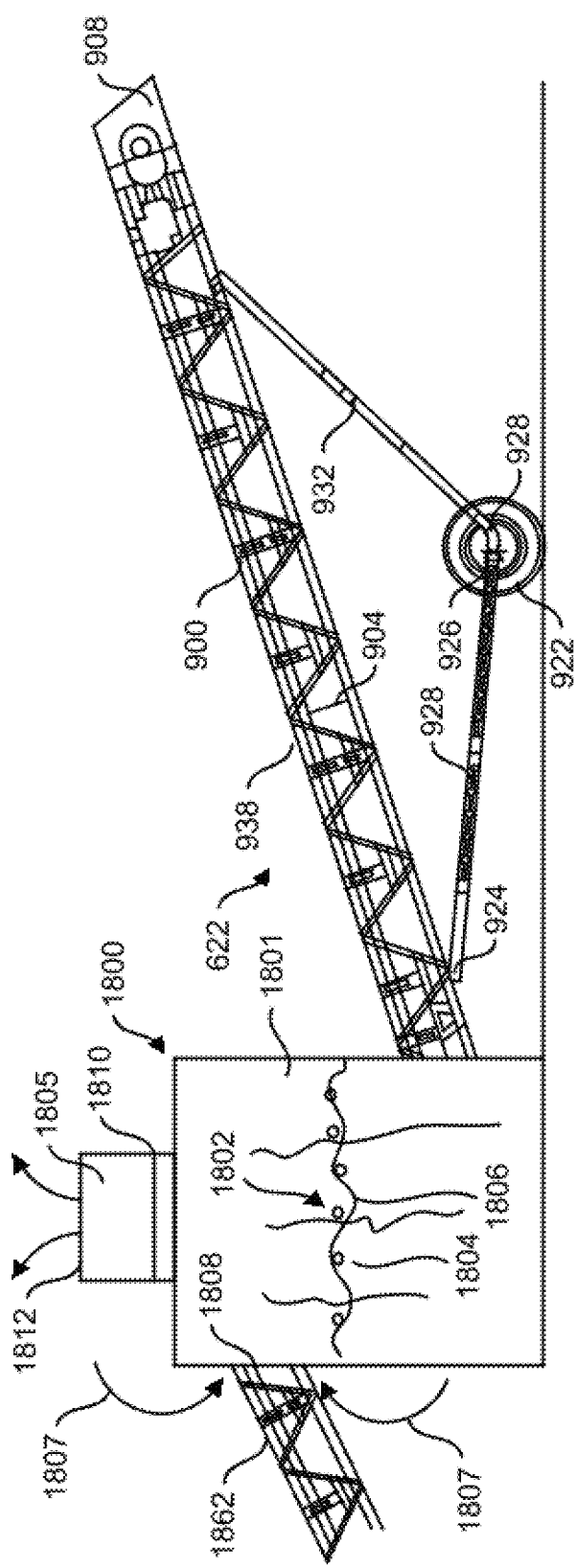
FIG. 18 shows a bag house covering the surge hopper for purposes of dust mitigation.

FIG. 18 shows a baghouse 1800 that may be used to cover the surge hopper for dust mitigation in the event that dry proppant is in use. The baghouse 1800 includes a fabric enclosure or cover 1801 with rope 1802 passing through eyelets 1804, 1806 and around an internal frame (not shown) of the surge hopper 616. A conveyor 1862 may be, for example, a conveyor like that shown in United State Patent Publication 2018/0065814. A blower 1805 pulls air 1807 into the baghouse 1800 through opening 1808. The air 1807 passes through a filter 1810 before passing through discharge opening 1804. The blower 1805 resides on interior framework (not shown) over the surge hopper 616 and is positioned such that the blower 1805 may be reversed to clean the filter 1810 by dropping trapped dust into the surge hopper 616.

Figure 19:
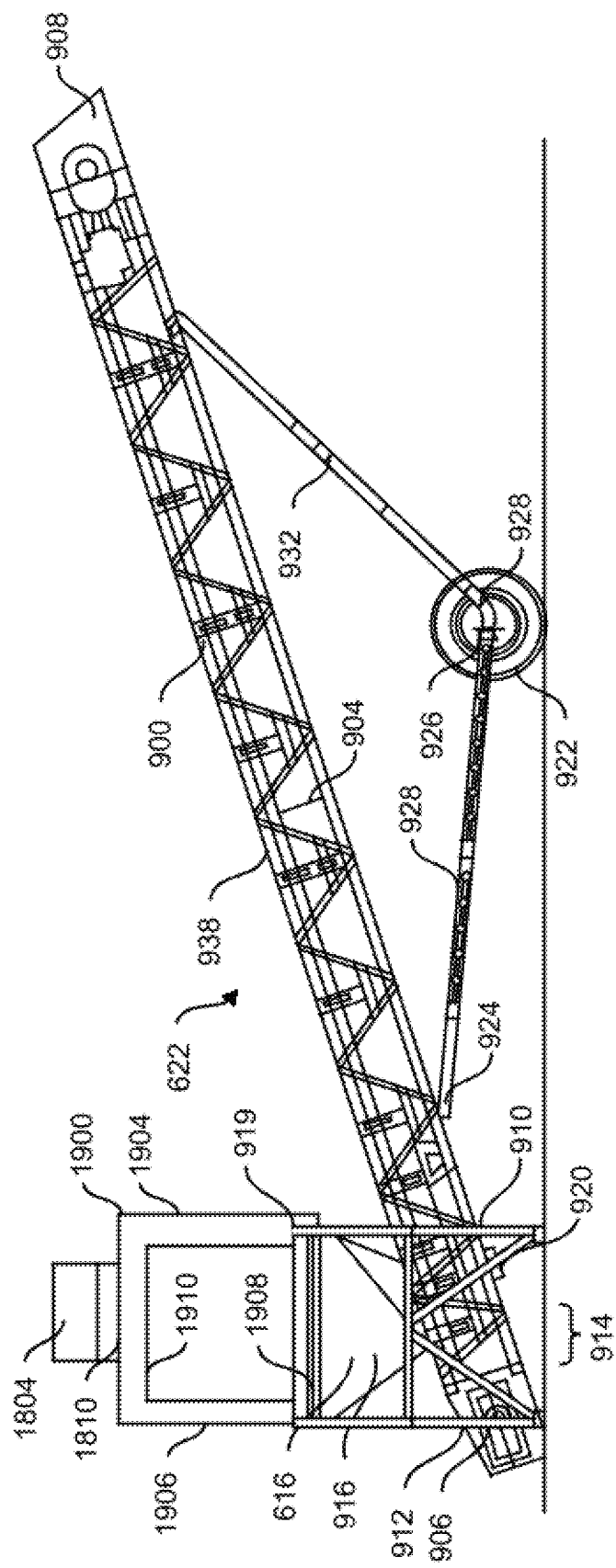
FIG. 19 shows the surge hopper supporting an interior frame for support of the baghouse.

FIG. 19 shows the interior frame 1900 supporting the blower 1805. The frame 1900 includes four upright posts connected by four lower horizontal members 1908 and four upper horizontal members 1910. The manner of attachment using the rope 1802 and the eyelets 1804 (see FIG. 18) may occur anywhere on the frame 1900.

Agglomerating Yoke

Figure 20:
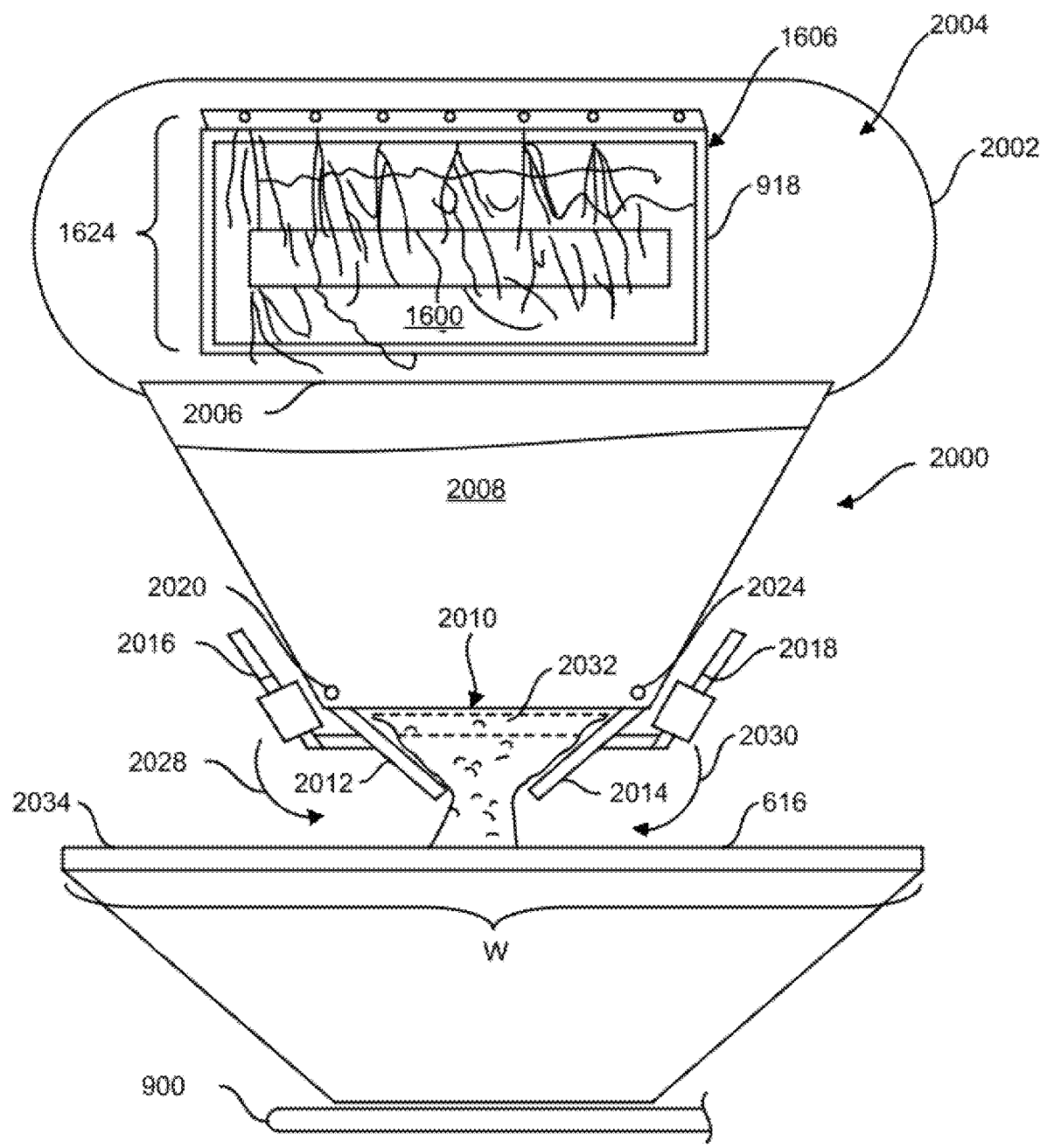
FIG. 20 shows an agglomerating yoke that compacts sand or other proppant exiting a discharge chute for purposes of dust mitigation.

FIG. 20 shows an agglomerating yoke 2000 that may be utilized for dust mitigation. The agglomerating yoke 2000 is positioned between the discharge chute 918 and the surge hopper 616 (see also FIG. 9). The surge hopper 616, for example, receives proppant 1600 as it is being discharged from the discharge chute 918. The mist sprayer assembly 1606 creates the mist zone 1624, and dust emissions may be further mitigated by the use of a dust shroud 2002 that envelops the region 2004 where the proppant is being discharged from the discharge chute 918. The proppant 1600 passes from top 2006 and through the interior passage of a downwardly tapering yoke body 2008 to exit through proppant discharge opening 2010. Doors 2012, 2014 are pivotally connected to the yoke body 2008. Each of the doors 2012, 2014 are provided with respective counterweight arms 2016, 2018 such that the force of gravity exerted on the counterweight arms 2016, 2018 acts in coordination with axial pivots 2020, 2024 to exert torque 2028, 2030 biasing the doors 2012, 2014 towards a normally closed position 2032 indicated by dashed lines 2032.

The purpose of the agglomerating yoke 2000 is to retain the proppant 1600 within the yoke body 2008 for a time of residence while dust particles in the proppant 1600, which would otherwise escape into the air, contact one another and particles within the proppant 1600. This contact causes the dust to agglomerate so there is less dust capable of escaping into the air at the discharge opening 2010. The doors 2012, 2014 increase the agglomeration by causing the proppant 1600 to back up within the yoke body 2008. This increases the residence time of the proppant 1600 within the yok body, and dust mitigation is thereby increased because more time is allowed for the agglomeration to occur. The top 2034 of surge hopper 616 is preferably larger in all dimensions W than is the top 2006 of the yoke body 2000. Thus, if the proppant 1600 within the yoke body 2008 spills over the top 2006, the larger dimensions W cause the spillage to fall into the surge hopper 616. It will be appreciated that, although the embodiment of FIG. 20 has two doors 2012, 2014, a single door may alternatively be provided.

Figure 21:
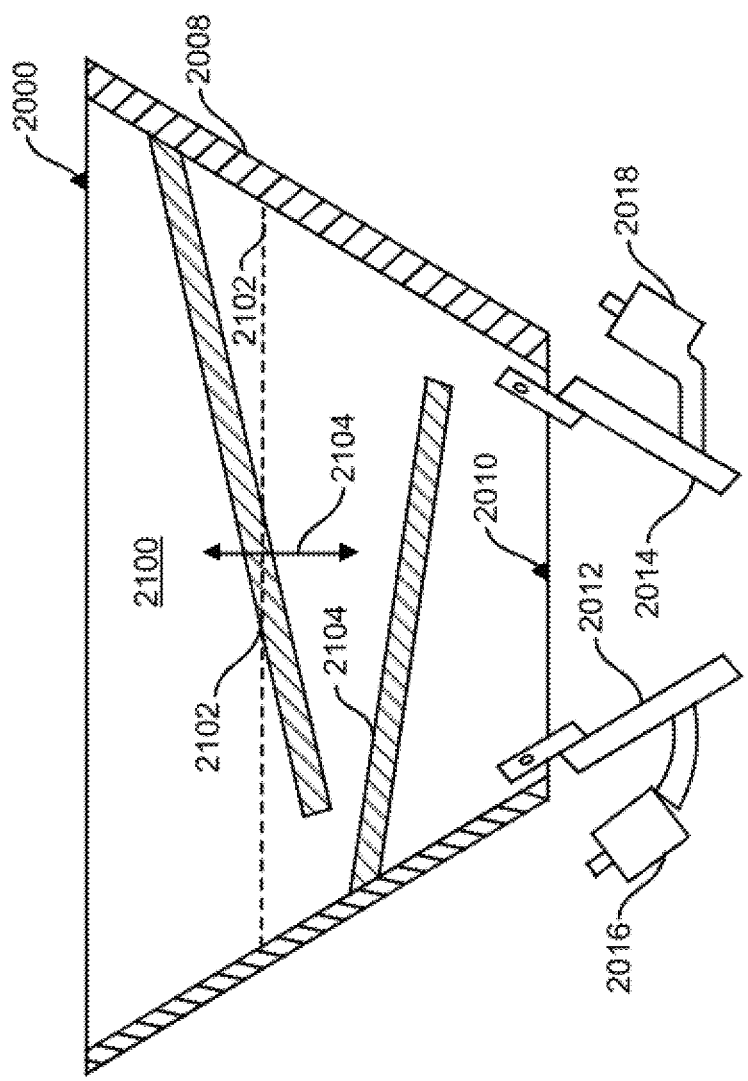
FIG. 21 is a midsectional view of the agglomerating yoke.

FIG. 21 is a midsection view of the agglomerating yoke 2000 that reveals the internal passage 2100 of the yoke body 2008. A dashed line 2102 indicates a residence volume within the yoke body 2008. The line 2102 varies with the volume of proppant residing in the yoke body at any given time and may move 2104 up or down depending upon the position of the doors 2012, 2014. The position of the doors 2012, 2014 varies according to the rate of incoming proppant and the force exerted by the counterweight assemblies 2016, 2018. In the alternative, the agglomerating yoke 2000 may be replaced by a hopper with an internal valve that is normally closed but is unseated by the lengthening of springs as the hopper fills with proppant. A system of plates or baffles 2102, 2104 is optionally provides to increase residence time within the internal passage. The residence time is suitably, for example, from 1 to 3 seconds or more. An alternative yoke for use in this application is described, for example, in U.S. Pat. No. 7,712,632 to Schwass, which is hereby incorporated by reference to the same extent as though fully replicated herein.

Figure 22:
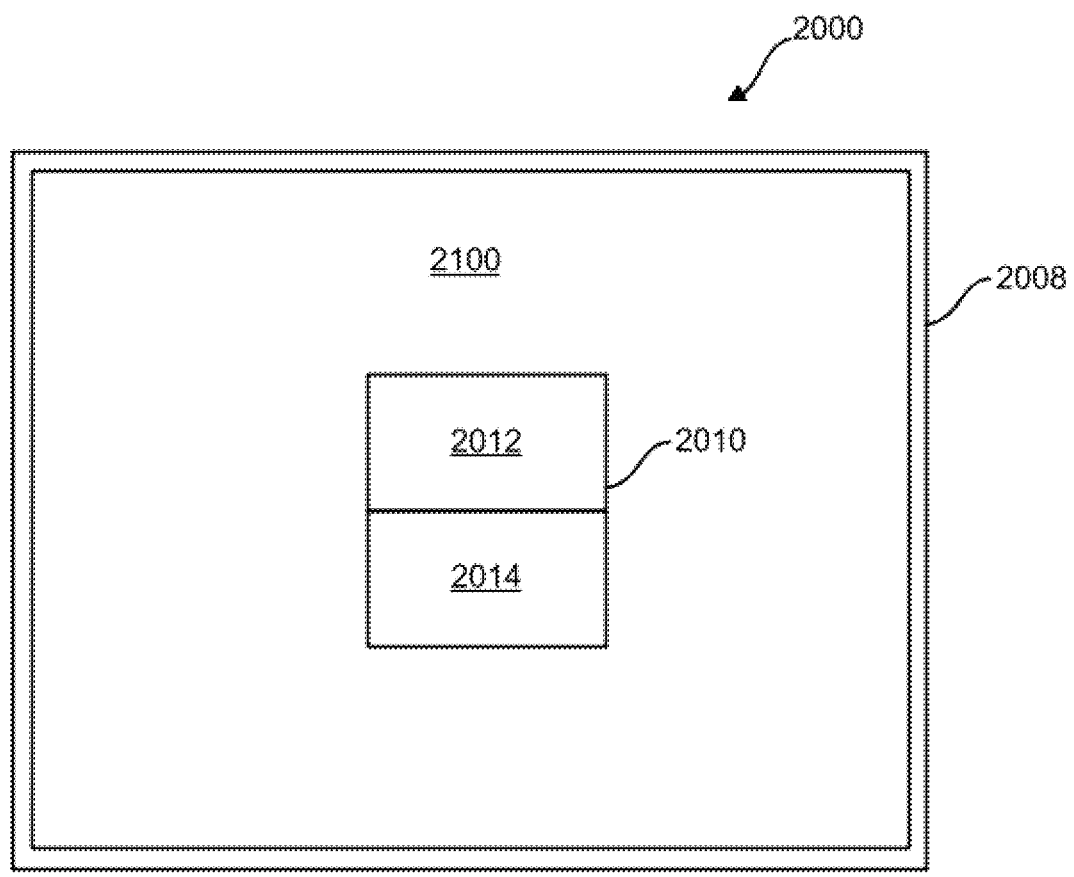
FIG. 22 is a top plan view of the agglomerating yoke.

FIG. 22 is a top plan view of the agglomerating yoke 2000. The doors 2012, 2014 are shown in a closed position under bias from the counterweights 2016, 2018.

Figure 23:
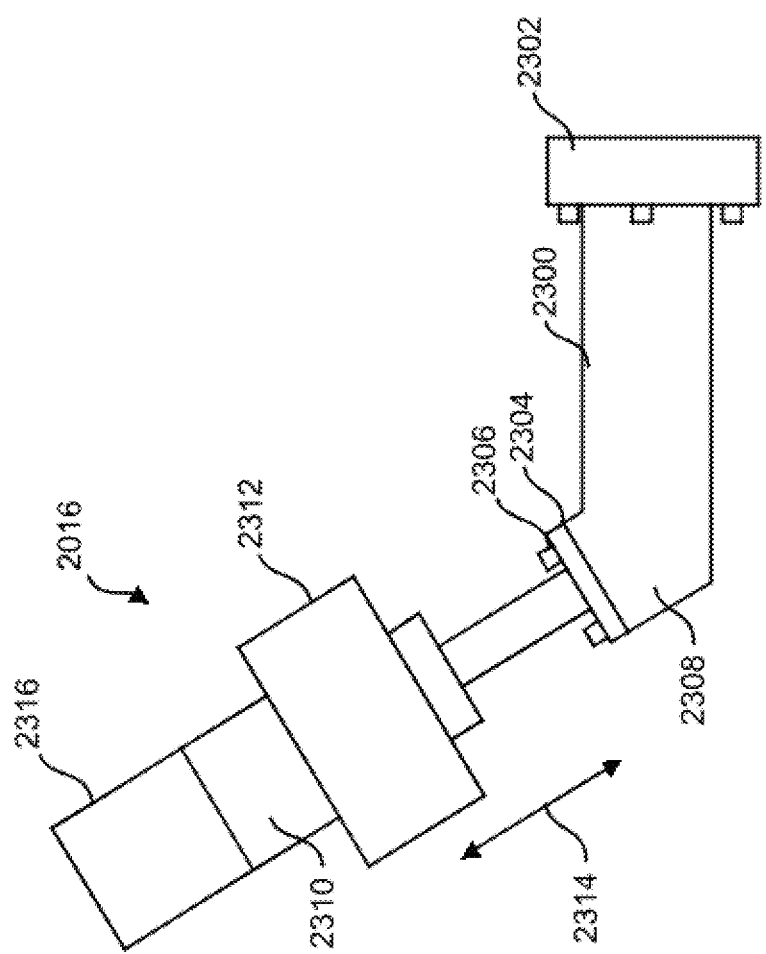
FIG. 23 illustrates a hydraulically actuated counterweight arm that forms part of the agglomerating yoke.

FIG. 23 provides additional detail about the counterweight 2016 according to one embodiment. The counterweight 2016 includes an arm segment 2300 attached to a first flange 2302 that may be bolted to the door 2012 (see FIG. 20). The arm segment 2300 has a bend 2304. A second flange 2306 is bolted to a portion of the arm segment 2300 remotely from the first flange 2302. An extensible hydraulic cylinder 2310 carries a lead weight 2312 that may be shifted by extension/retraction 2314 of the hydraulic cylinder 2310 under the control of a servo package 2316.

Figure 24:
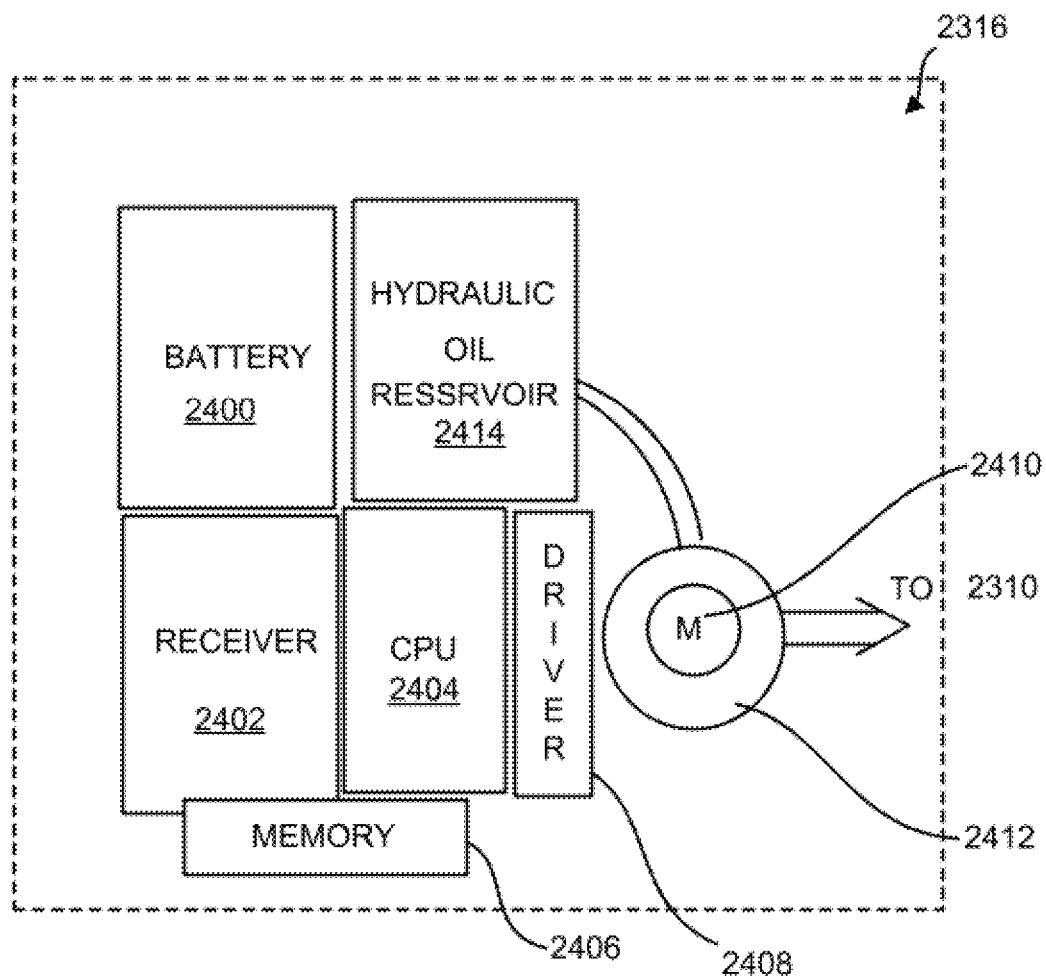
FIG. 24 illustrates the components of a servo package that controls operation of the hydraulically actuated counterweight arm.

FIG. 24 shows the elements of the servo package 2316 according to one embodiment. The servo package 2316 is powered by battery 2400. A radio receiver 2402 receives command signals that may emanate, for example, from a control van (not shown) on a hydraulic fracturing location. The receiver 2402 digitizes and passes the control signals to a processor 2404 operating on program instructions from memory 2406. The processor 2404 causes driver circuitry 2408 to activate a servo motor that actuates a pump 2412. The pump 2412 draws hydraulic oil from reservoir 2414 for extension of the hydraulic cylinder 2310. Reverse actuation of the pump 2412 by the servo motor 2410 causes the hydraulic cylinder 2310 to retract. The processor and memory are able to track the degree of extension of the hydraulic cylinder 2310, for example, using a magnetic pickoff (not shown) to count the rotations of the pump 2412. Moving the weight 2312 away from the second flange 2306 (see FIG. 23) provides a lever advantage that increases the torque 2028 exerted on door 2012.

Isolated Control Room

Figure 25:
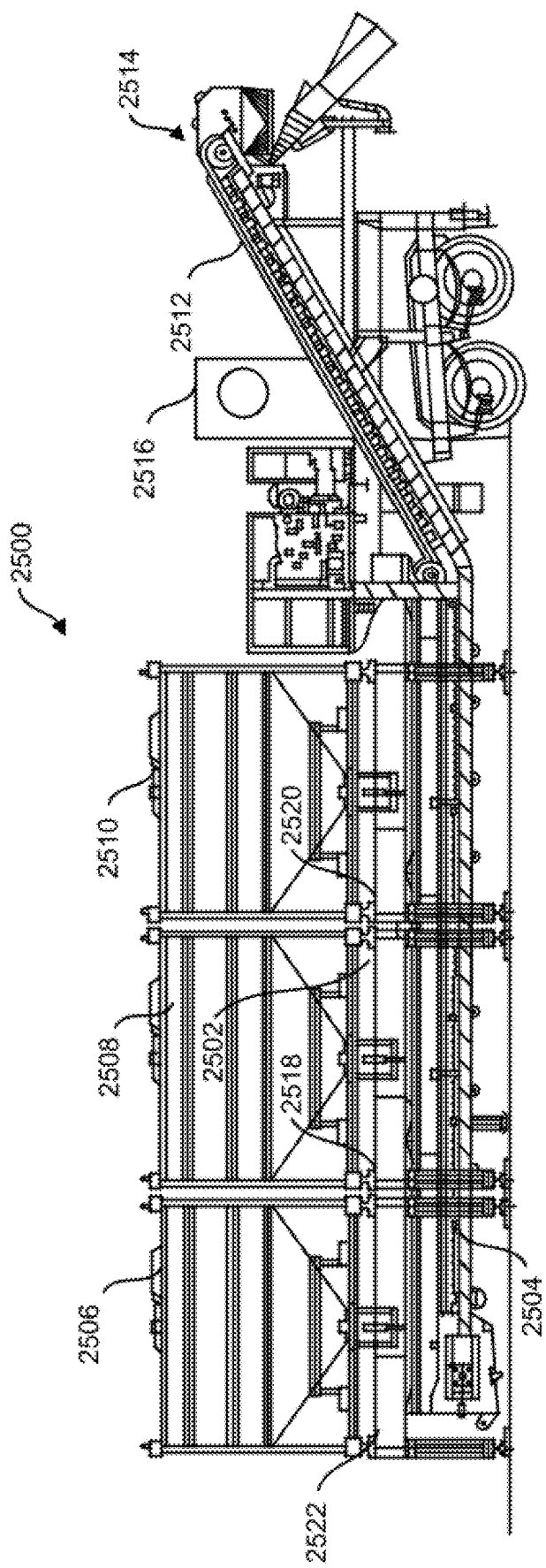
FIG. 25 shows an isolated control room positioned on a conveyor sled to protect an operator thereof from exposure to silica dust.

FIG. 25 shows an improved conveyor sled 2500 for the distribution of proppant. The conveyor sled 2500 includes a frame 2502 supporting a conveyor belt 2504 that receives proppant from containers 2506, 2508, 2510. The conveyor belt 2504 delivers the proppant to a rising section 2512 terminating in a discharge chute 2514, which may be, for example, the discharge chute 918 shown in FIG. 9. The conveyor sled 2500 resembles that shown in United States Patent Publication 2018/0065814 to Eiden et al. but has been improved by the addition of an isolated control room 2516. The isolated control room 2516 is optionally selectively detachable from the conveyor sled and may be used as an individual unit on a standalone basis, ore the isolated control room may be positioned on another type of frac equipment, such as a blending unit or a pumping unit (not shown). The isolated control room 2516 may also be used as an enhancement to frac van or in place of a frac van that serves as a control facility governing all aspects of a hydraulic fracturing operation.

The isolated control room 2516 is a pressure-positive system that contains a fully functional operator's control panel and interior room for an operator to reside during a hydraulic fracturing operation. As shown in FIG. 25, the isolated operator's control room is mounted on the conveyor sled 2500 but may also be suitably mounted on other equipment known to the art, such as a blender tub, a pumping unit or a separate trailer. The conveyor sled 2500 is further improved by the attachment of vibrators 2518, 2520, 2522 to the frame 2502 for use in circumstances where the containers 2506-2510 contain wet sand. The vibrators are as described above and shake the frame 2502 together with the containers 2506-2510 sufficiently to dislodge wet sand from within the containers 2506-2510.

Figure 26:
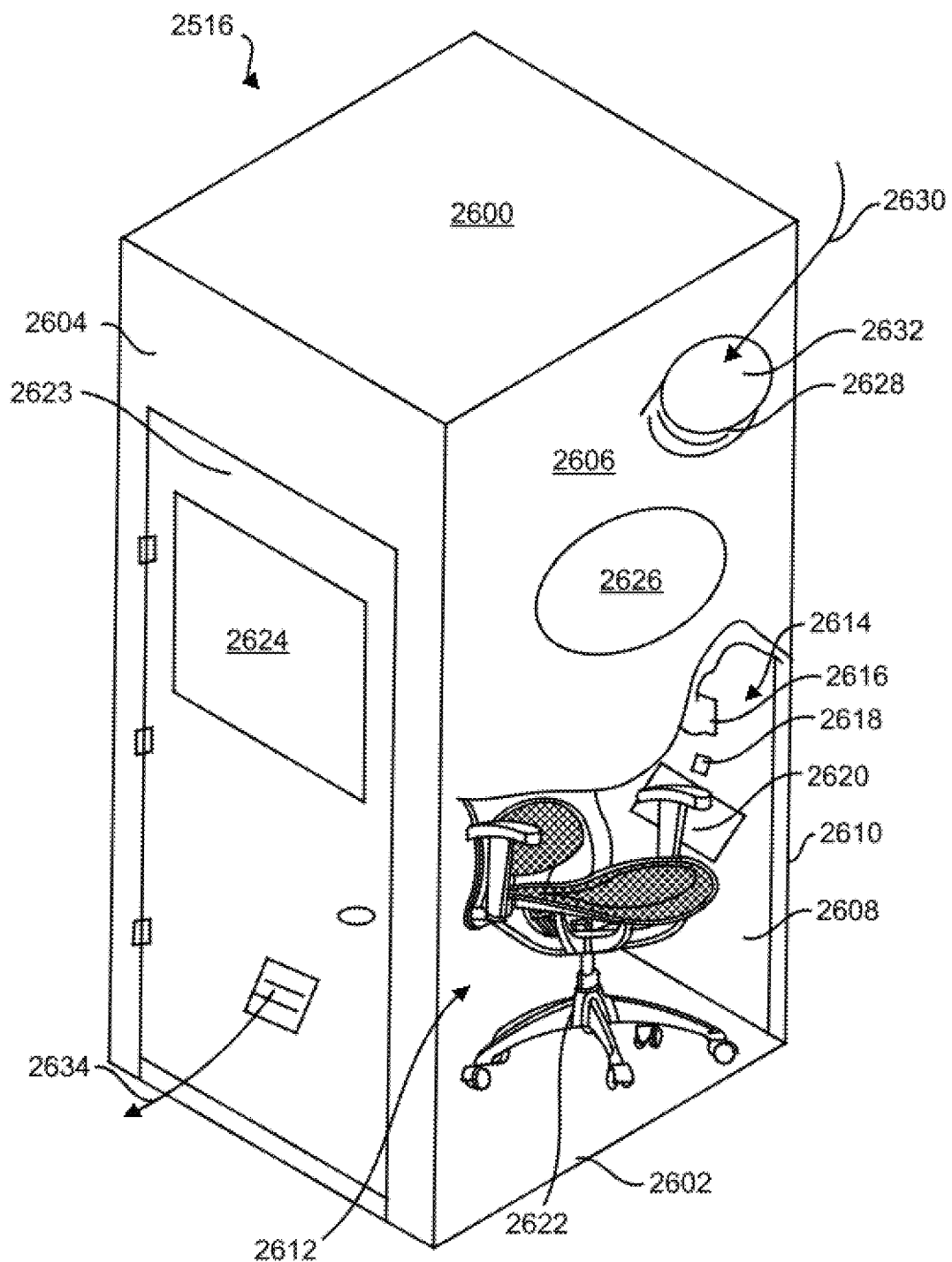
FIG. 26 provides additional detail with respect to the isolated control room.

FIG. 26 shows the isolated control room 2516 in additional detail according to one embodiment. The isolated control room 2506 has a top 2600, a bottom 2602, and sidewalls 2604, 2606, 2608 supported by frame 2610. It will, be appreciated that a fourth sidewall (not shown) is hidden in the perspective of FIG. 26. And that as shown in FIG. 26 a portion of the sidewall 2606 has been removed for purposes of illustration to reveal the contents of an inner chamber 2612. The inner chamber 2612 contains an operator control panel 2614 with a display 2616, knobs 2618, and keyboard 2620. A chair 2622 is optionally provided. Sidewall 2604 contains a door 2623 with a window 2624, and each of sidewalls 2606, 2608 is provided with a portal. The various windows and portals provide visibility such that the operator is able to observe the surrounding equipment in operation.

An electric blower 2628 is positioned to draw in air 2630 through filter 2632, which removes dust particles from the air 2630 as the air 2630 passes into the interior chamber 2612. This creates a cross-flow of slightly overpressure air within the chamber 2612, such that filtered air 2634 exits the interior chamber 2612 through vent 2634. It will be appreciated that the blower 2628 may optionally be provided with a heating element (not shown). The filter 2632 may be replaced as the filter 2632 becomes full of captured dust particles. The filter 2632 may be optionally wet using a water supply to make an evaporative cooler.

Figure 30:
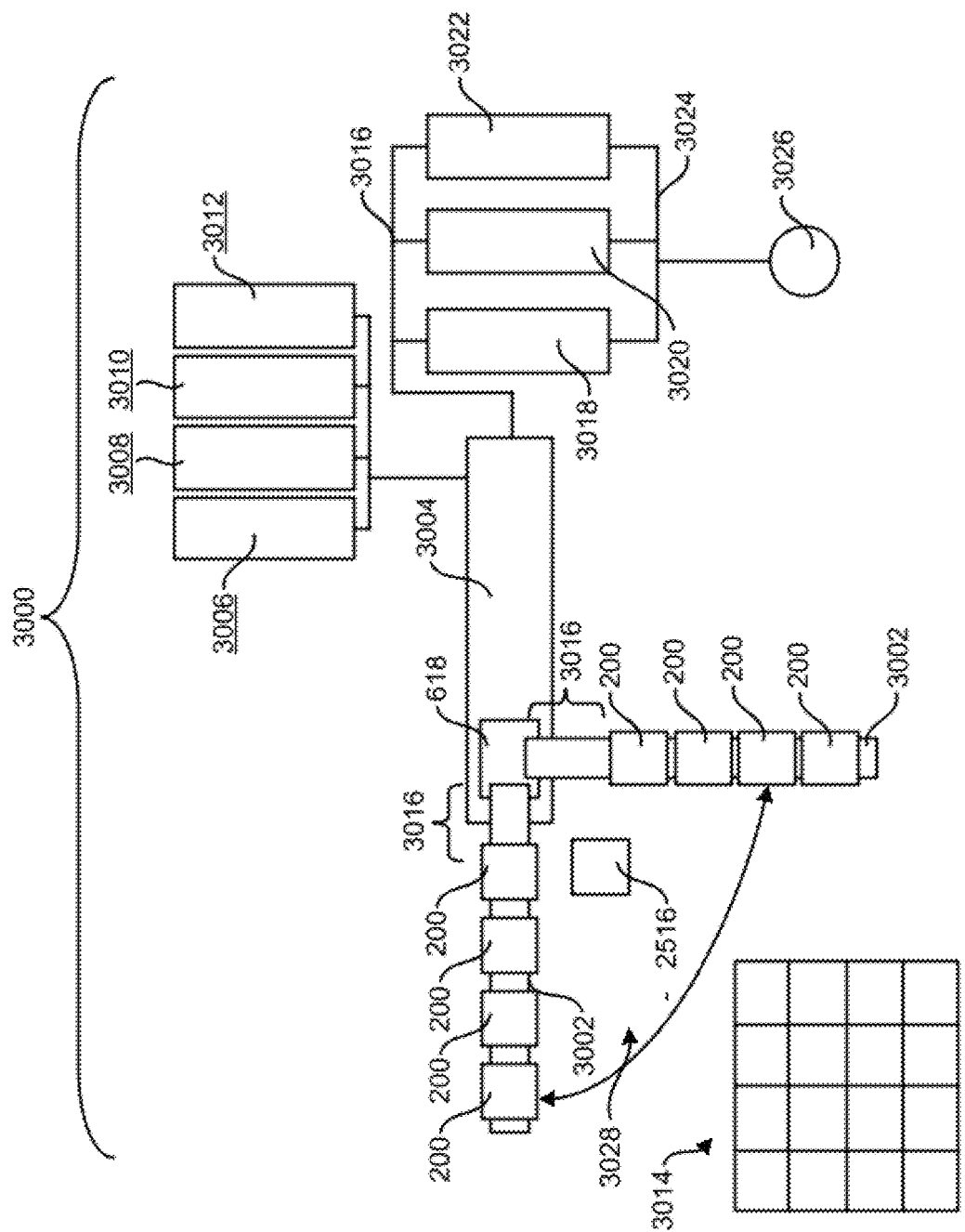
FIG. 30 shows a layout of frac equipment with use of containerized dry sand according to one embodiment.

FIG. 30 shows a layout 3000 of surface equipment as described above when deployed in support of a hydraulic fracturing operation utilizing dry sand according to one embodiment. Two conveyor assemblies 3002, 3002' are provided to move sand from containers 200, 200' towards the blender hopper 618. The conveyor assemblies 3002, 3002' have respective horizontal portions where containers 200, 200' reside. The blender hopper resides on a blending unit 3004 that mixes the sand (or other proppant) from the containers 200. 200' with frac fluids from tanks 3006, 3008, 3010, 3012. There may be any n umber of containers 200, 200' and any number of tanks 3006-3012. In operation, forklift operators (not shown) replace the containers 200, 200' when empty, taking new containers from a container storage area 3014 as needed. Thus, the respective horizontal portions of conveyor assemblies 3002, 3002' where the containers 200, 200' reside are at a suitable height for the conduct of forklift operations.

Most blender tubs like blender tub 618 rise in elevation to a height that is problematic for forklift operations. Thus, the respective conveyor assemblies 3002, 3002' are each provided with a rising nose 3016, 3016' to lift the sand up to the blender tub 618. Mixed effluent emanating from the blending unit 3004 travels through lines 3016 to frac pumping units 3018, 3020, 3022, which pressurize the effluent for pumping through high pressure lines 3024 and into a wellhead 3026 according to design parameters for a hydraulic fracturing operation intended to stimulate flow potential from a downhole formation. For injection wells, the stimulation may also be done to stimulate the flow potential into an injection well. There may be any number of frac pumping units 3018-3022.

As shown in FIG. 30, the isolated control room 2516 stands alone and is not mounted on any of the other equipment. This positioning of the isolated control room 2516, i.e., proximate the intersection of conveyor assemblies 3002, 3002' permits one or more operators within the isolated control room to observe the proppant renewal operations as containers 200, 200' are rotated out of the container storage area 3014. The isolated control room 2516 also resides in an area 3028 that is defined by an angle $\theta$ extending between the elongate axes of conveyors 3002, 3002'. As shown in FIG. 30, the angle $\theta$ is a right angle, but more generally the angle may be suitably from 0 to 130 degrees. The angle $\theta$ may also be an acute angle, an oblique angle, or an obtuse angle.

Figure 31:
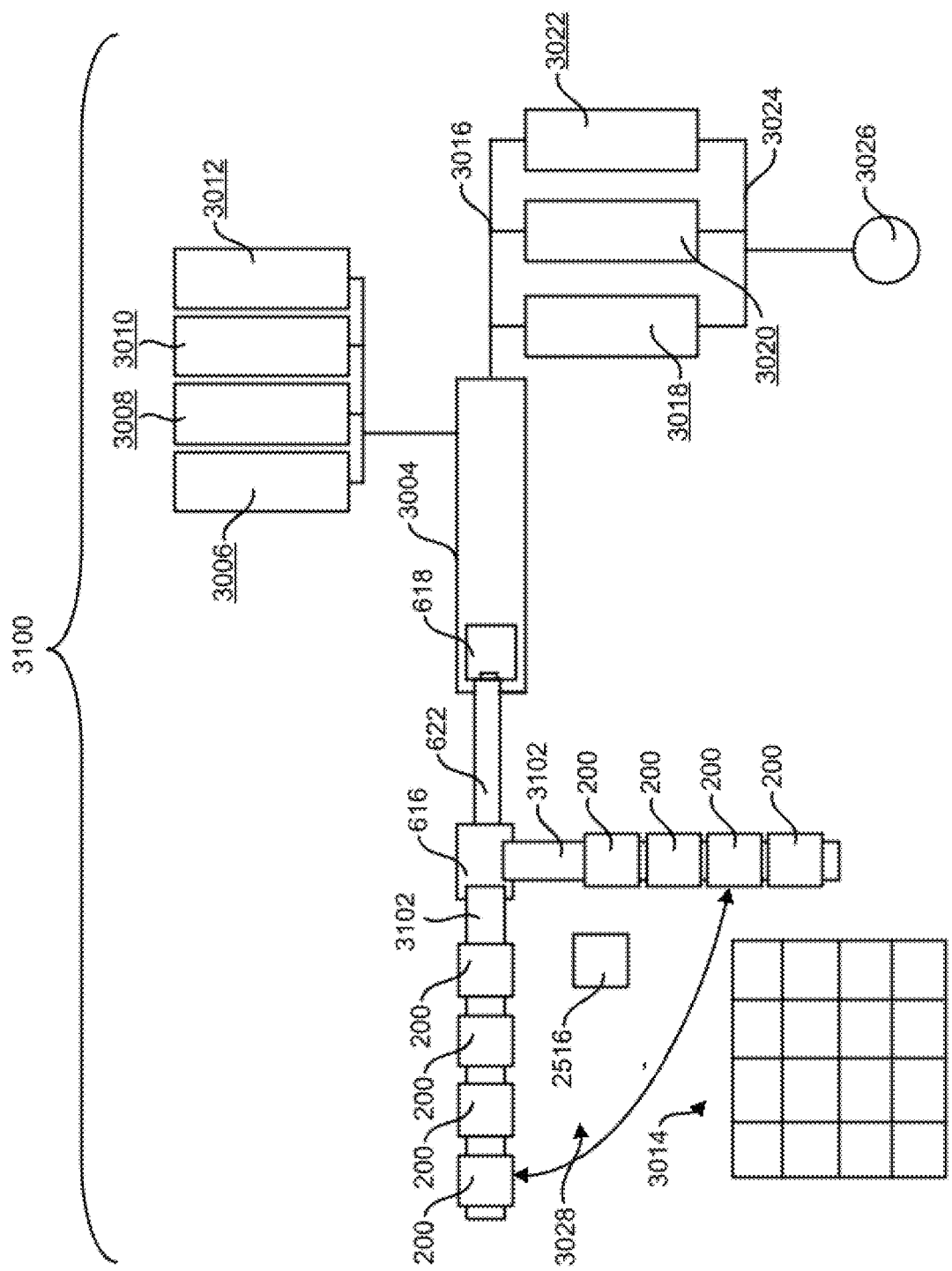
FIG. 31 shows a layout of frac equipment with use of containerized wet sand according to one embodiment.

FIG. 31 shows a layout 3100 of surface equipment as described above when deployed in support of a hydraulic fracturing operation utilizing wet sand according to one embodiment. In order to simplify this discussion of FIG. 31, like numbering is retained with respect to identical parts as previously described in context of FIG. 30. The layout 3100 differs from layout 3000 in that conveyor assemblies 3102, 3102' are essentially horizontal and do not have respective noses 3016, 3016' rising up to the height of the blender tub 618. Generally speaking, different types of conveyor belts may be in use on the conveyor assemblies 3102, 3102', such as textured or partitioned belts where the surface features of the belt on the metering conveyor 622 is deeper than the belt of the conveyor assemblies 3102, 3102' to prevent leakage or spillage of water from the wet sand as the proppant ascents on the metering conveyor 622 towards the blender tub 618.

Those of ordinary skill in the art will understand that the foregoing discussion teaches by way of example and not be limitation. Accordingly, what is shown and described may be subjected to insubstantial change without departing from the scope and spirit of invention. The inventors hereby state their intention to rely upon the Doctrine of Equivalents, if needed, in protecting their full rights in the invention.

We claim:

1. A proppant delivery system for hydraulic fracturing operations, comprising:
   a surge hopper;
   a blending unit including a blender tub;
   a first proppant delivery subsystem constructed and arranged to carry proppant from proppant containers where the proppant resides and discharging into the surge hopper at a first rate,
   the first proppant delivery subsystem being a conveyor belt;
   a conveyor system separate from the first proppant delivery subsystem, the conveyor system being constructed and arranged to lift proppant from within the surge hopper towards the blender tub for discharge into the blender tub at a second rate
   the conveyor system standing separate and apart from the first proppant delivery subsystem and the blending unit;

the blender tub being operable for mixing the proppant with one or more frac fluid constituents to create a mixture and for discharging the mixture for use according to specifications for a hydraulic fracturing operation including discharge of the mixture at a third rate;

a plurality of sensors deployed on the system at control points for use in producing signals representative of density and flow rates as needed to adjust the volume and density of the mixture discharging at the third rate;

an electronic flow controller in communication with the plurality of sensors for receipt of the signals;

the electronic flow controller being programmed with logic for driving the first proppant delivery subsystem and the conveyor system to synchronize at least one of the first rate and the second rate based upon requirements for meeting the third rate according to frac fluid density and flow rate specifications for an in-progress hydraulic fracturing operation.

2. The proppant delivery system of claim 1, further comprising a knife edge gate mounted on the surge hopper, the conveyor system having a belt extending beneath an interior volume of the surge hopper and positioned to lift a ribbon of sand of uniform thickness deposited onto the belt from within the surge hopper.

3. The proppant delivery system of claim 2, wherein the knife edge gate includes a plate that is slidingly engaged between a pair of channels and a clamp that selectively and adjustably mounts the plate in fixed position to dispense the ribbon of sand.

4. The proppant delivery system of claim 1, further comprising a knife edge gate mounted on the conveyor system and configured to dispense a ribbon of sand of uniform thickness onto the belt of the conveyor system.

5. The proppant delivery system of claim 4, wherein the knife edge gate includes a plate that is slidingly engaged between a pair of channels and a clamp that selectively and adjustably mounts the plate in fixed position to dispense the ribbon of sand.

6. The proppant delivery system of claim 1, further comprising a knife edge gate mounted on at least one of the conveyor system and the surge hopper, the knife edge gate being configured to dispense a ribbon of sand of uniform thickness onto the belt of the conveyor system; and a rate controller that is programmed to drive the belt motive mechanism for movement of the endless belt at a rate in synchrony with at least one other component of equipment for use in a hydraulic fracturing operation, the synchrony being based in part upon a volumetric rate of flow using a calculation that includes the thickness of the ribbon of sand and a speed of the belt over an interval of time.

7. The proppant delivery system of claim 1, further comprising a scale operably configured to sense a load on a sand motive mechanism, a rate controller that is programmed to drive the belt motive mechanism for movement of the endless belt at a rate in synchrony with at least one other component of equipment for use in a hydraulic fracturing operation, the synchrony being based in part upon a calculation utilizing a sensed signal from the scale and a speed of the belt over an interval of time.

8. The proppant delivery system of claim 1, wherein the first proppant delivery subsystem is a conveyor sled assembly.

9. The proppant delivery system of claim 1, wherein the first proppant delivery subsystem is a drag link assembly.

10. The proppant delivery system of claim 1, wherein the electronic flow controller is programmed with logic for driving the first proppant delivery subsystem and the conveyor system to synchronize the first rate and the second rate based upon requirements for meeting the third rate according to frac fluid density and flow rate specifications for an in-progress hydraulic fracturing operation.

11. The sand distribution system of claim 1, wherein the improvement further comprises: a rack equipped with a wash system arranged to facilitate dispensation of sand from at least one of the proppant containers; and an automated flow controller constructed to obtain density and flowrate information, and to form a slurry within design specifications to feed a blender tub for a hydraulic fracturing operation over a period of time.

12. The sand distribution system of claim 11 wherein the automated flow controller is programmed in a sequence loop that adjusts flowrate of material exiting the system according to the design specifications and then adjusts density of material remaining within the system.

13. The sand distribution system of claim 11 wherein the first proppant delivery subsystem lacks a conveyor belt.

14. The sand distribution system of claim 11, wherein the automated flow controller operates wirelessly to communicate with a plurality of densitometers, flowmeters, and pumps on the rack.

15. The sand distribution system of claim 11, wherein the automated flow controller is configured for communications with sensors and pumps, the automated flow controller being programmed with instructions for obtaining hydraulic fracturing job design parameters including at least proppant slurry flowrate and proppant slurry density values; receiving sensed proppant slurry flowrate and proppant slurry density values during performance of the hydraulic fracturing job; determining whether the sensed proppant slurry flowrate is according to design specification and, if the sensed proppant slurry flowrate is out of specification, for determining a flowrate adjustment as needed to bring the flowrate within specification; and determining whether the sensed proppant slurry density is according to design specification and, if the sensed proppant slurry density is out of specification, for determining a mass adjustment as needed to bring the density within specification.

16. A method of hydraulic fracturing to stimulate a well, comprising:

delivering containers filled with wet sand to a location where a hydraulic fracturing operation is being performed, and using the proppant delivery system according to claim 1 to dispense the wet sand in support of the hydraulic fracturing operation.

17. The method of hydraulic fracturing according to claim 16, where the method further comprises a step of washing the wet sand from within the containers onto a sand motive mechanism.

18. The method of hydraulic fracturing according to claim 16, wherein the sand motive mechanism is a drag link mechanism.

19. The method of hydraulic fracturing according to claim 16, wherein the sand motive mechanism includes a trough.

20. The method of hydraulic fracturing according to claim 16, wherein the first proppant deliver subsystem includes a conveyor sled assembly.

* * * * *